US008509389B2

(12) United States Patent
Duvaut et al.

(10) Patent No.: US 8,509,389 B2
(45) Date of Patent: *Aug. 13, 2013

(54) SYSTEMS AND METHODS FOR LOOP LENGTH ESTIMATION BASED ON PER-PORT CALIBRATION

(75) Inventors: Patrick Duvaut, Tinton Falls, NJ (US); Amitkumar Mahadevan, Eatontown, NJ (US); Vaibhav Dinesh, New Delhi (IN)

(73) Assignee: Ikanos Communications, Inc., Fremont, CA (US)

( * ) Notice: Subject to any disclaimer, the term of this patent is extended or adjusted under 35 U.S.C. 154(b) by 1559 days.

This patent is subject to a terminal disclaimer.

(21) Appl. No.: 12/044,443

(22) Filed: Mar. 7, 2008

(65) Prior Publication Data

US 2008/0298555 A1  Dec. 4, 2008

Related U.S. Application Data

(60) Provisional application No. 60/905,474, filed on Mar. 7, 2007.

(51) Int. Cl.
*H04M 3/22* (2006.01)

(52) U.S. Cl.
USPC .................................. 379/27.03; 379/22.02

(58) Field of Classification Search
USPC ............. 379/1.01, 3, 22, 22.01, 22.04, 27.01, 379/27.03, 22.02
See application file for complete search history.

(56) References Cited

U.S. PATENT DOCUMENTS

| | | | |
|---|---|---|---|
| 6,031,300 A * | 2/2000 | Moran | 307/119 |
| 6,266,395 B1 * | 7/2001 | Liu et al. | 379/27.01 |
| 6,668,041 B2 * | 12/2003 | Kamali et al. | 379/1.04 |
| 6,707,886 B2 * | 3/2004 | Erving et al. | 379/1.04 |
| 6,819,746 B1 * | 11/2004 | Schneider et al. | 379/29.01 |
| 7,076,056 B1 * | 7/2006 | Lane et al. | 379/413.03 |
| 8,130,911 B2 | 3/2012 | Borjesson et al. | |
| 2004/0174903 A1 * | 9/2004 | Duvaut et al. | 370/469 |
| 2005/0163287 A1 * | 7/2005 | Ouyang et al. | 379/3 |
| 2006/0098725 A1 * | 5/2006 | Rhee et al. | 375/222 |
| 2006/0120442 A1 * | 6/2006 | Melsa et al. | 375/222 |
| 2006/0227940 A1 * | 10/2006 | Ferdosi et al. | 379/22.04 |
| 2006/0251160 A1 * | 11/2006 | Fazlollahi et al. | 375/222 |
| 2008/0089485 A1 * | 4/2008 | Duvaut et al. | 379/1.03 |
| 2010/0195708 A1 * | 8/2010 | Belge et al. | 375/228 |
| 2010/0296633 A1 * | 11/2010 | Lindqvist et al. | 379/27.01 |

OTHER PUBLICATIONS

Ouyang, Feng, "From ABCD to S Matrix", Conexant Systems Inc. Technical Document, Jun. 12, 2006.
Bell, Alcatel, "SELT: Derivation of Formula for Computation of Calibrated S11", ITU Telecommunications Standardization Sector, COM 15-D 921-E (Study Group 15—Delayed Contribution 921), Oct. 21-31, 2003.

* cited by examiner

*Primary Examiner* — Olisa Anwah
(74) *Attorney, Agent, or Firm* — Mark J. Danielson; Pillsbury Winthrop Shaw Pittman LLP

(57) ABSTRACT

Systems and methods for performing loop length estimation are described. One embodiment includes a method which comprises receiving an echo signal for a loop under test where the echo signal is a per-port calibrated echo response obtained using frequency domain reflectometry single-ended line testing (FDR-SELT). The method further comprises analyzing characteristics of the echo signal to perform a loop length estimation based on data relating to ripple frequency as a function of loop length.

20 Claims, 29 Drawing Sheets

SYSTEMS AND METHODS FOR LOOP LENGTH ESTIMATION BASED ON PER-PORT CALIBRATION

CROSS-REFERENCE TO RELATED APPLICATION

This application claims priority to, and the benefit of, U.S. Provisional Patent Application entitled, "REMEDY DSL LAYER-1 SELT-FDR ANALYSIS ENGINE BASED ON PER-PORT CALIBRATION," having Ser. No. 60/905,474, filed on Mar. 7, 2007, which is incorporated by reference in its entirety.

TECHNICAL FIELD

The present disclosure generally relates to point-to-point wire line communications and more particularly to single end loop testing of digital subscriber line (DSL) communication systems.

BACKGROUND

Prior to deploying xDSL transmissions, a subscriber loop is generally qualified or characterized by estimating the channel capacity, which depends on the transfer function of the network. The subscriber loop (or line) connects the customer premises (CP) to the central office (CO) and can be affected by a wide range of impairments, including but not limited to, load coils, bridge taps, mixed wire gauges, and bad splices. While the loop length and the wire gauge of the loop are generally not considered actual impairments, they also have a large impact on xDSL transmissions. Other impairments include split pairs, untwisted drop cables, radio-frequency interference (RFI), and cross-talk. Moreover, several of the aforementioned impairments for xDSL transmissions are not present for POTS (plain old telephony service) because xDSL exploits a much wider frequency band as compared to POTS. Consequently, the existing POTS testing equipment is not capable of qualifying a subscriber loop for xDSL transmission. Due to these impairments, the xDSL network termination (NT) installed at the CP may in some cases not even link up with the xDSL line termination (LT) in the DSL access multiplexer (DSLAM) at the CO. If the xDSL modems do link up with one another, there is no guarantee with respect to the quality-of-service (QoS) in terms of bit rate.

Qualifying a subscriber loop for xDSL requires estimating its channel capacity, which depends on the attenuation of the line and also on the noise power spectral density (PSD) at the CO for upstream transmission and at the CP for downstream transmission, respectively. The estimate of the channel capacity of a particular loop/line will be most accurate if the transfer function of the line and the noise PSD at the CO and CP are measured directly.

Conventional methods for qualifying a subscriber loop include use of xDSL test units available on the market that are capable of performing such measurements. In addition, these test units are often combined with a "golden" modem plug-in module that emulates a real xDSL modem of a certain type, such as ADSL, in order to estimate the real bit rate instead of only the theoretical channel capacity. However, this approach requires sending a technician to the CP, which is very expensive. Single-ended loop testing (SELT) can be used to extract information about the transmission environment (e.g., the loop) in a DSL system by performing reflective measurements remotely at the CO/CP (or Modem) terminal, without the need to dispatch a technician. As an example, SELT may comprise injecting signals into a loop under test at a central office (CO) in order to determine the loop capability for supporting different kinds of DSL services. As such, SELT often plays an important role in DSL provisioning and maintenance.

SUMMARY

Briefly described, one embodiment, among others, includes a method which comprises receiving an echo signal for a loop under test where the echo signal is a per-port calibrated echo response obtained using frequency domain reflectometry single-ended line testing (FDR-SELT). The method further comprises analyzing characteristics of the echo signal to perform a loop length estimation based on data relating to ripple frequency as a function of loop length. Another embodiment is a method which comprises measuring a calibrated echo signal of a loop under test and estimating the loop length based on ripples on the calibrated echo signal and a specified region.

Yet another embodiment is a system which comprises a first module coupled to the loop where the first module is configured to generate a test signal and receive a reflected signal to determine an echo response of the loop. The system further comprises a second module configured to receive the echo response measurement from the first module. The second module is further configured to determine characteristics associated with the loop based on the echo response and to output a loop length estimation based on data relating to ripple frequency as a function of loop length.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

Figure 1:
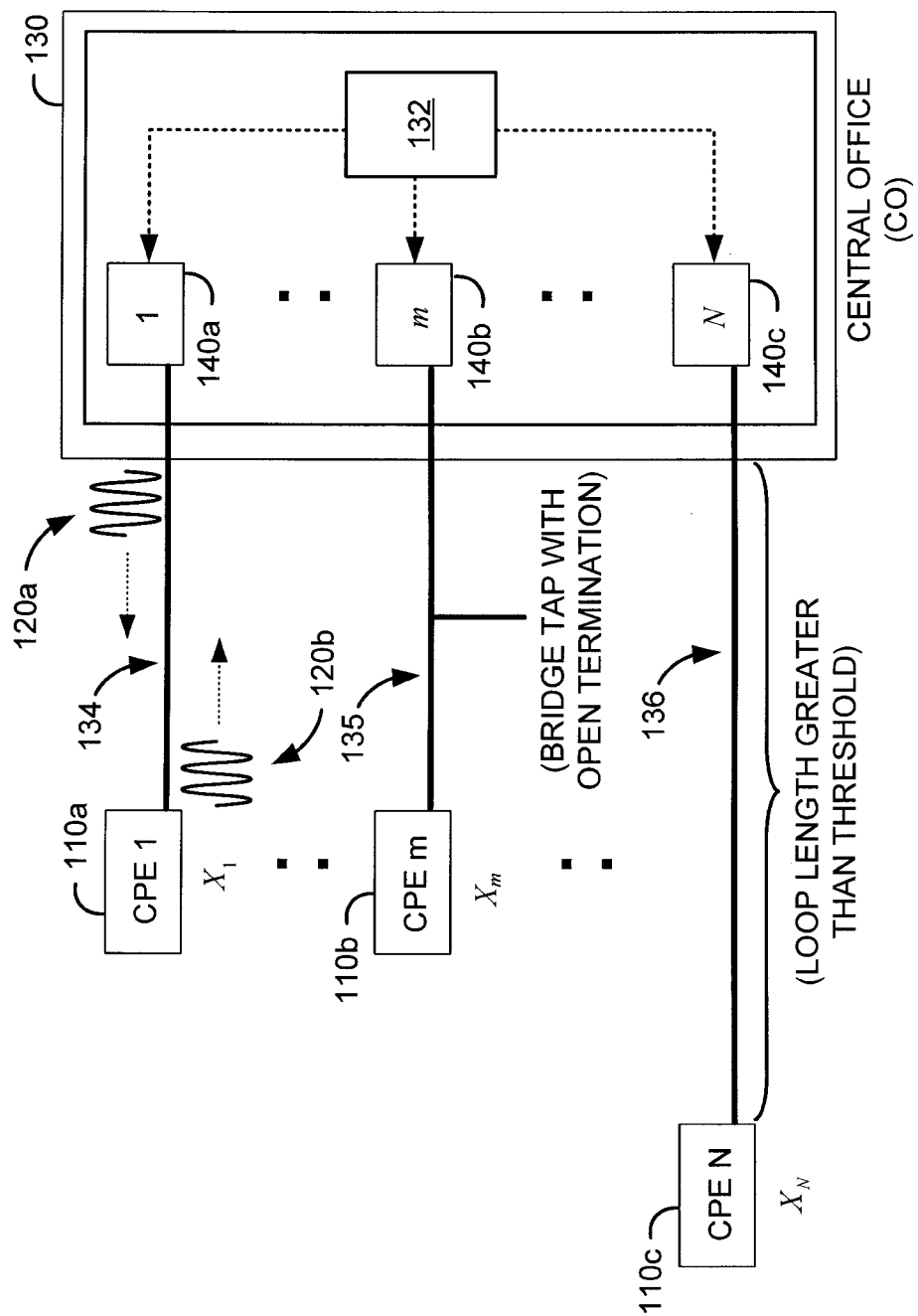
FIG. 1 illustrates an xDSL system in which embodiments of SELT are applied.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

In a wire-line broadband system, one of the primary objectives is to qualify a subscriber-loop for xDSL transmission by estimating its channel capacity. This can be achieved if the loop characteristics such as the topology, loop-length, gauge, and line-end status are known. These loop characteristics also serve as useful tools for trouble-shooting and diagnostic purposes in the event that a provisioned service experiences problems or fails. Accordingly, systems and methods are described herein for analyzing the per-port calibrated echo ($S_{11}(f)$) in the frequency domain to estimate the loop characteristics discussed above. More specifically, the subscriber loop being characterized is identified as a bridge-tapped (BT) loop, an inconsistent loop, or a straight loop. Furthermore, for loops classified as straight loops, the following estimations are performed: loop length, loop gauge, and termination type (i.e., open or short).

One technique used for gathering SELT measurements is frequency-domain reflectometry (FDR) where a frequency sweep is performed on the loop under test in order to derive frequency-selective characteristics. For example, peaks in the measured receive signal correspond to frequencies that create standing waves. Measurement of the one-port scattering parameter involves determining the echo response of the loop. For purposes of nomenclature used herein, the echo response may also be referred to as $S_{11}$, $S_{11}(f)$, or echo signal. Based on the echo response, the input impedance of the loop as a function of frequency can be determined from which loop characteristics can be estimated. Such characteristics may include, for example, loop length and loop termination type.

When performing single-ended loop testing (SELT), various factors can affect the accuracy of the measurements and ultimately affect any estimations derived from the measurements. One factor is the presence of a long loop where the measuring capability of the system is exceeded. Another factor relates to the topology of the loop itself (such as those due to bridge taps, for example). Accordingly, embodiments described herein for performing SELT indicate when such factors exist, as they can result in erroneous estimations. Systems and methods are described for capturing and analyzing frequency domain reflectometry single-ended loop test (FDR-SELT) measurements to determine whether the response corresponds to a loop that has bridge taps. Exemplary embodiments described herein are based on the per-port calibrated FDR-SELT ($S_{11}(f)$) echo in the frequency domain and in particular, on the actual analysis of the calibrated echo signal. Based on this analysis, valuable loop information can be derived from different characteristics of the $S_{11}$ signal.

It should be noted that exemplary embodiments described herein may also include the ability to flag $S_{11}$ responses that are associated with very long loops in addition to the ability to detect inconsistent loop estimates. For purposes of nomenclature used herein, the term "Layer 0" generally refers to the phase of FDR-SELT whereby a signal is transmitted into the loop under test and the scattering parameters are captured and calibrated. The term "Layer 1" generally refers to the post-processing phase whereby the data captured in Layer 0 is used to derive meaningful information relating to the loop under test.

Reference is now made to FIG. 1, which illustrates an xDSL system in which embodiments of SELT are applied. In the non-limiting example shown in FIG. 1, N end users (or N sets of CPE 110a, 110b, 110c) are depicted where each user 110a, 110b, 110c is referenced using an index m. The end users 110a, 110b, 110c are connected via a loop to a central office (CO) 130, where a SELT module 132 for deriving loop characteristics may be implemented. The CO 130 may include an xDSL access multiplexer (DSLAM), xDSL line cards 140a, 140b, 140c, and other equipment for interfacing with end users 110a, 110b, 110c. In some embodiments, the SELT module may be incorporated into xDSL line cards 140a, 140b, 140c. In other embodiments, the xDSL line cards 140a, 140b, 140c may interface with the SELT module 132. It should be noted that while embodiments for SELT are described here in the context of central offices, the principles of SELT contained in this disclosure may also be incorporated into customer premises equipment as well.

The SELT module 132 first performs Layer 0 functions and injects a test signal 120a onto the loop under test. The reflected signal 120b is then measured to determine the echo response of the loop. The nature of the reflected signal 120b will vary depending on the characteristics of the loop. FIG. 1 shows three non-limiting examples of various loop configurations. Loop 134 is a straight loop configuration, whereas loop 135 and loop 136 depict a bridge tap loop and a long loop, respectively. Generally, the definition of a "long" loop may vary and is based on a predetermined threshold. As a non-limiting example, a loop that exceeds 2 km may be categorized as a long loop.

Figure 2A:
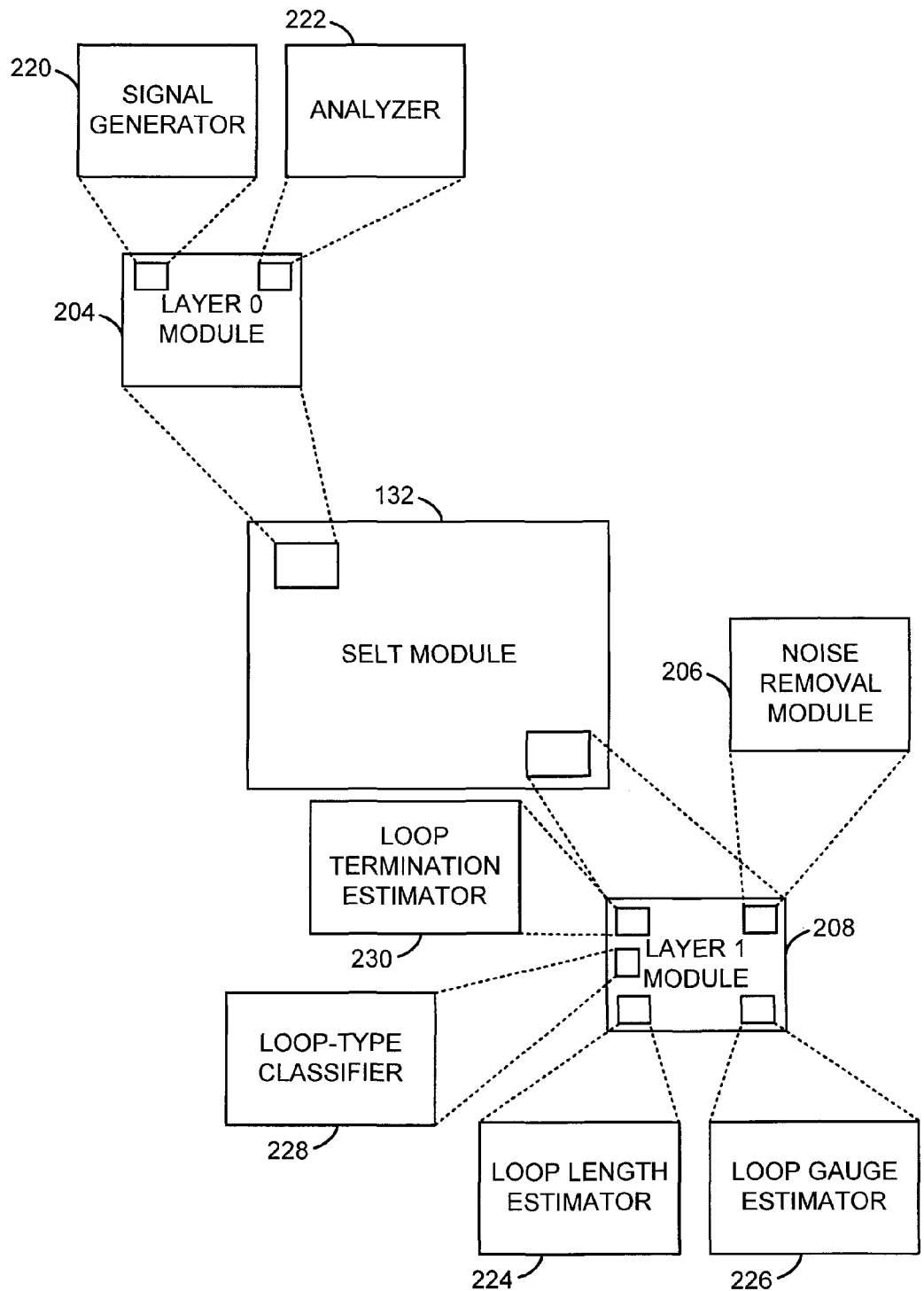
FIG. 2A depicts various components of the SELT module depicted in FIG. 1.

FIG. 2A depicts various components for the SELT module depicted in FIG. 1. In accordance with exemplary embodiments, the SELT module 132 may comprise a Layer 0 module 204 and a Layer 1 module 208. The Layer 0 module 204 may further comprise a signal generator 220 and an analyzer 222. The signal generator 220 transmits test signals on the loop under test. The analyzer 222 monitors the reflected signal to derive s-parameters associated with the network. The Layer 1 module 208 receives information from the Layer 0 module 204, including a calibrated $S_{11}$ parameter. The Layer 1 module 208 may comprise a loop length estimator 224, a loop-type classifier 228, and a loop termination estimator 230. For other embodiments, the Layer 1 module 208 may also include a loop gauge estimator 226 if a priori knowledge of the loop gauge is not available. Furthermore, the Layer 1 module 208 may also include a noise removal module 206.

Figure 2B:
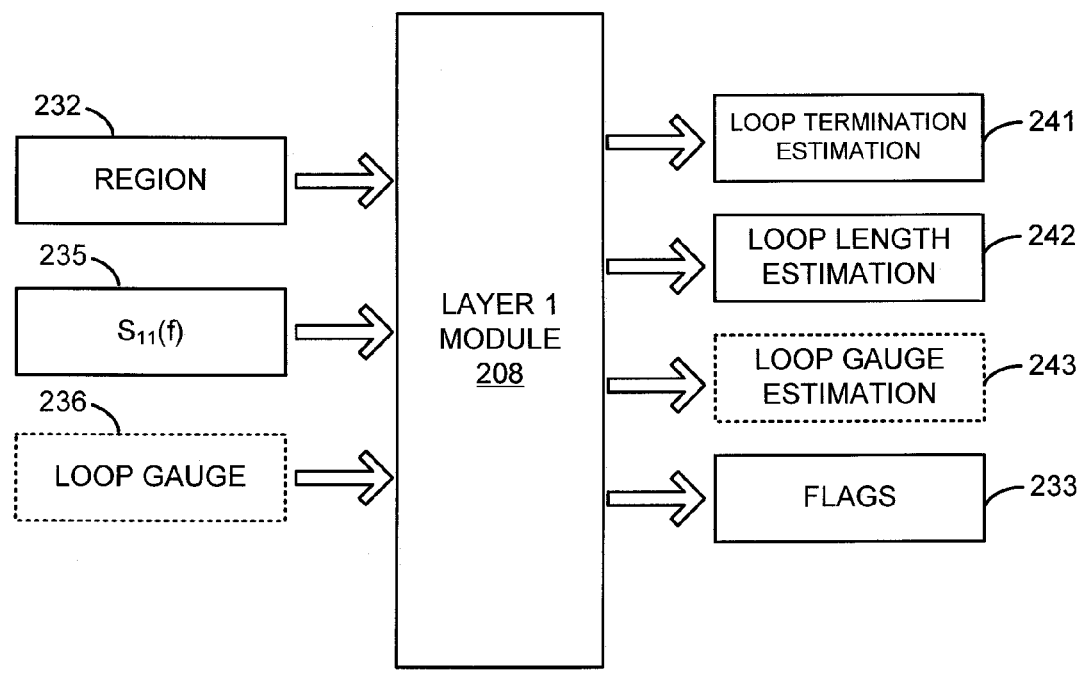
FIG. 2B depicts the signal flow for the Layer 1 module shown in FIG. 2A.

FIG. 2B depicts the signal flow for the Layer 1 module shown in FIG. 2A. Prior to deriving characteristics associated with the loop, the Layer 1 module 208 may receive such inputs as the region 232 associated with the loop. As non-limiting examples, the region may be designated as North America or Japan. The calibrated $S_{11}$ parameter 235 is also forwarded to the Layer 1 module 208. Finally, if a priori knowledge regarding the loop gauge is available, this information may also be forwarded to the Layer 1 module 208.

Based on the inputs, the Layer 1 module 208 derives information relating to the loop including, an estimation of the loop length 240, the termination type on the loop 241.

It should be emphasized that depending on whether the Layer 1 module 208 determines that the loop under test is not a straight loop, the Layer 1 module 208 may raise various flags 233 to denote that the estimations may be inaccurate. For example, in the event that the loop is determined to be a long loop, the Layer 1 module 208 will flag that the measuring capabilities of the overall system has been exceeded. As a result, an indicator or flag of some type may be raised. As another example, the Layer 1 module might raise a flag if the presence of a bridge tap is detected on the loop under test or based on some anomaly observed in the $S_{11}$ signal, an inconsistency is detected in the loop under test. The purpose of these indicators or flags is to convey that the derived loop characteristics (e.g., loop length, termination type, loop gauge) might not be accurate.

Figure 3:
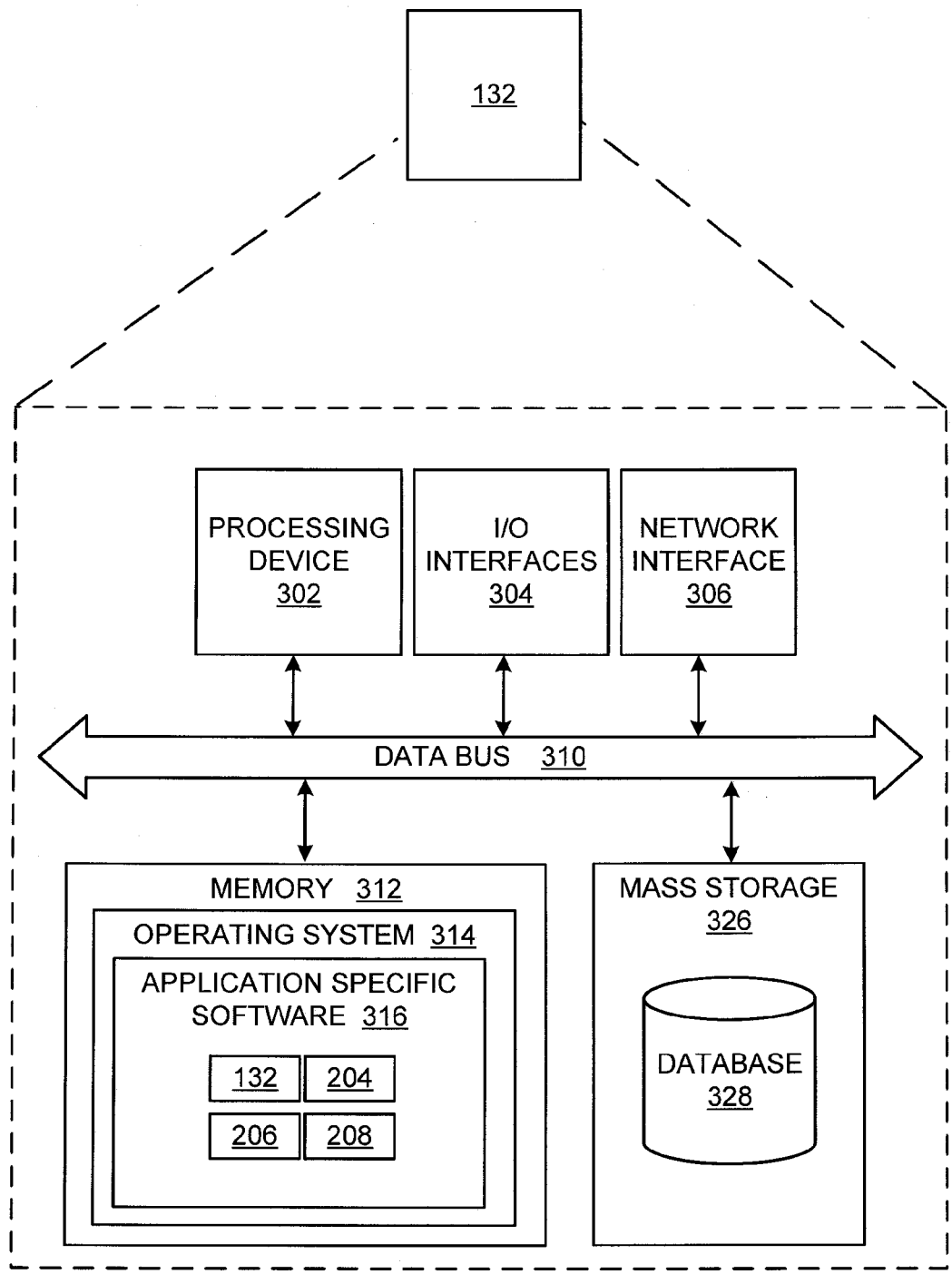
FIG. 3 illustrates an embodiment of the SELT module shown in FIGS. 1 and 2.

Reference is now made to FIG. 3, which illustrates an embodiment of the SELT module shown in FIGS. 1 and 2. Generally speaking, the SELT module 132 may be incorporated into the central office and can comprise any one of a wide variety of computing devices. Irrespective of its specific arrangement, SELT module 132 can, for instance, comprise memory 312, a processing device 302, a number of input/output interfaces 304, a network interface 306, and mass storage 326, wherein each of these devices are connected across a data bus 310.

Processing device 302 can include any custom made or commercially available processor, a central processing unit (CPU) or an auxiliary processor among several processors associated with the SELT module 132, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 such as the Layer 0 module 204 and Layer 1 module 208 depicted in FIG. 2A. One of ordinary skill in the art will appreciate that the memory 312 can, and typically will, comprise other components which have been omitted for purposes of brevity.

Input/output interfaces 304 provide any number of interfaces for the input and output of data. With further reference to FIG. 3, network interface device 306 comprises various components used to transmit and/or receive data over a network environment. The SELT module 132 may further comprise mass storage 326. For some embodiments, the mass storage 326 may include a database 328 to store and manage such data as metadata.

Figure 4A:
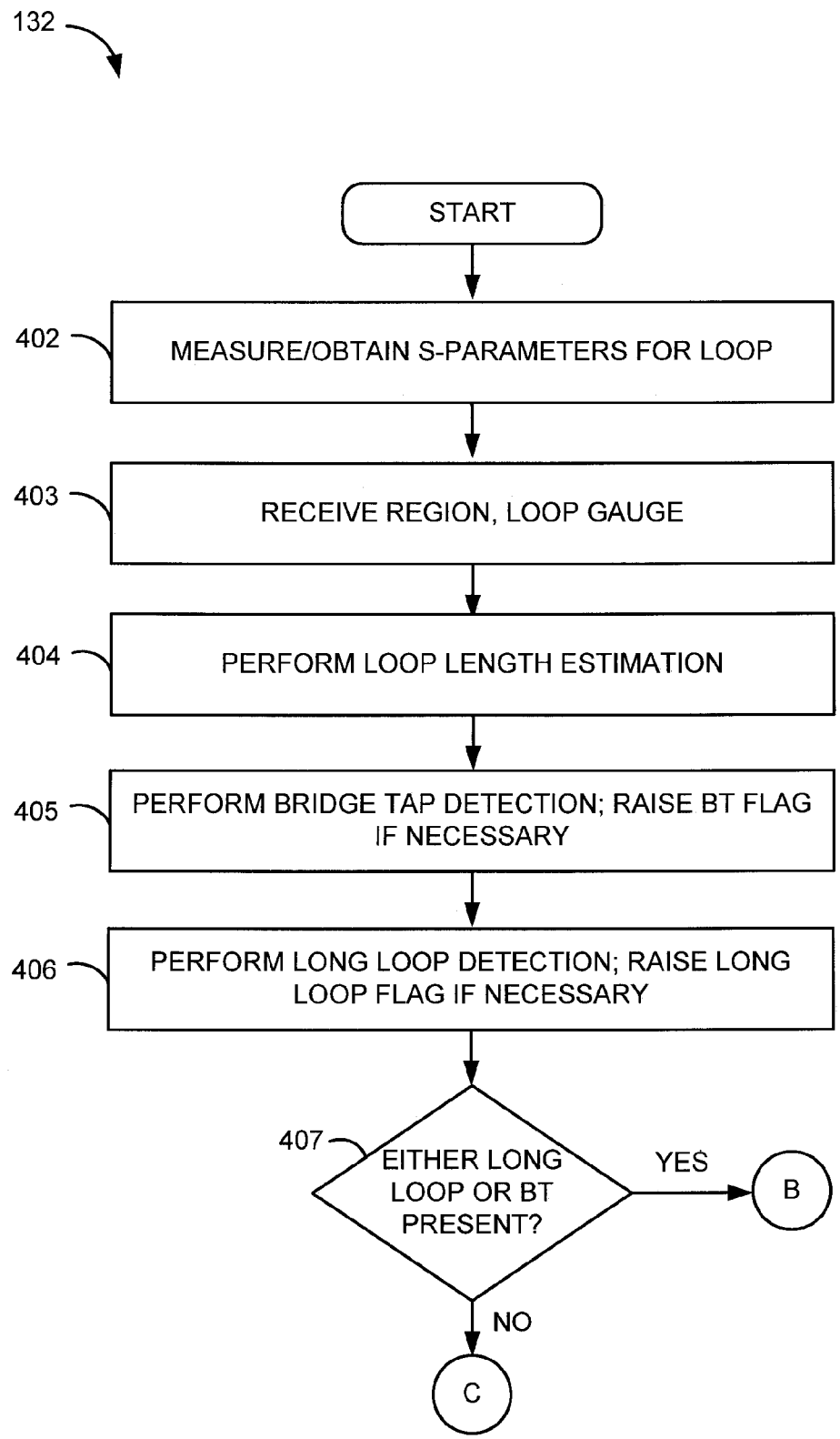
FIG. 4A-B are top level flowcharts for an embodiment of a process for performing FDR-SELT utilizing the components depicted in FIGS. 1, 2A-B.
Figure 4B:
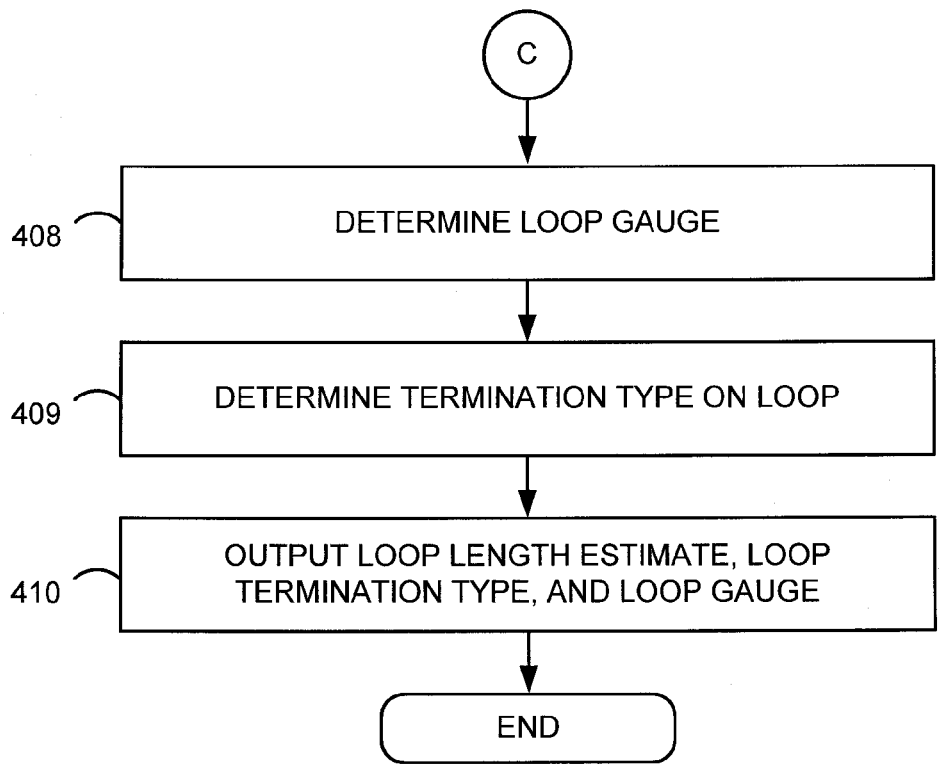
Figure 4B:
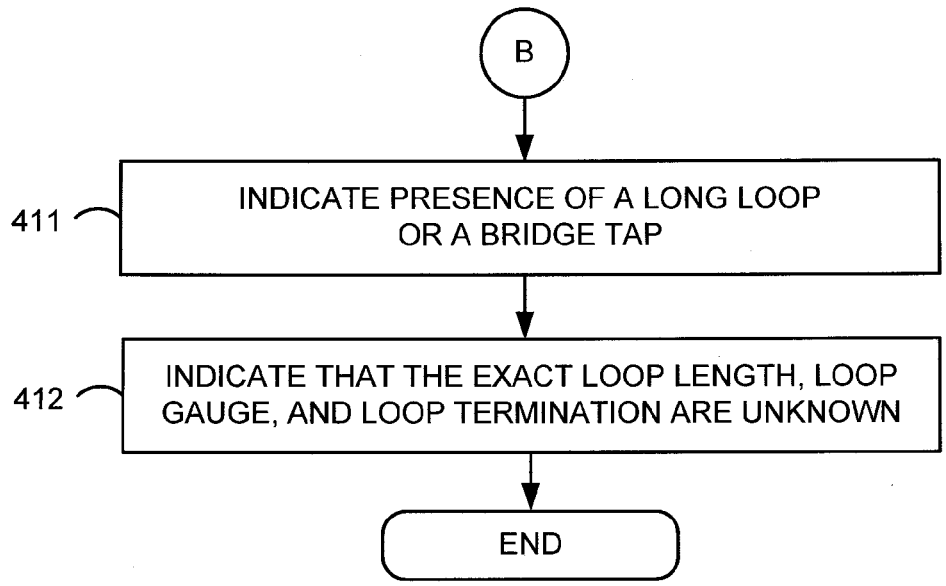

FIGS. 4A-B provide a top level flowchart for an embodiment of a process for performing FDR-SELT utilizing the components depicted in FIGS. 1, 2A-B. In particular, FIGS. 4A-B is an embodiment of the overall analysis/processing performed using the echo response obtained for a particular loop. In accordance with exemplary embodiments, the steps discussed below may be performed by the FDR-SELT module 132 shown in FIG. 2A. Based on the echo response, such metrics as loop length, termination type, and loop gauge can be derived. The presence of a bridge tap can also be determined based on the echo response.

Step 402 begins by measuring or obtaining calibrated s-parameters. In step 403, the relevant region (e.g., North America, Japan) is specified along with the loop gauge, if available. Based on the $S_{11}$ parameter along with the region and loop gauge, an estimation of the loop length is performed (step 404). Further, a determination is made on whether a bridge tap exists on the loop (step 405). In particular, a determination is made on whether a straight loop exists. Next, a determination is made on whether the loop is a long loop (step 406). As emphasized earlier, if the loop exceeds a certain threshold, the loop is considered a long loop and the measuring capabilities system performing the test is exceeded.

If the loop does not exceed the predetermined threshold and a bridge tap is not present (decision block 407), then a loop gauge estimation is performed if the loop gauge is unknown (step 408). An estimation of the termination type (short vs. open termination) is also performed and forwarded as an output (steps 409, 410). Furthermore, the loop length estimate and loop gauge is output (step 410). Referring back to decision block 407, if the loop exceeds the predetermined threshold (i.e., the loop is a long loop) or if a bridge tap is present, then the method proceeds to node B, depicted in FIG. 4B. If a long loop is present, a flag or some indication is made that a long loop exists (step 411). Likewise, if a bridge tap is present, then a flag is raised accordingly. Further, no attempt is made to determine the termination on the loop as either the measuring capability of the system is exceeded at the end of the loop or a bridge tap is present (step 412). As such, an indication is made that the exact loop length, the loop gauge, and the loop termination are unknown (step 412).

Various embodiments for estimating the loop length are now described. However, the basis for utilizing the calibrated $S_{11}$ parameter to calculate a loop length is first discussed. By analyzing the one-port scattering parameter ($S_{11}$) of the loop under test as a function of frequency, certain behavior may be monitored which is dependent on the loop length. In particular, the period of ripples observed in the amplitude of the $S_{11}$ signal depends largely on the loop length and is generally independent of the particular loop gauge or termination type. As a result, the period of the ripples can be utilized to estimate the loop length.

Figure 5:
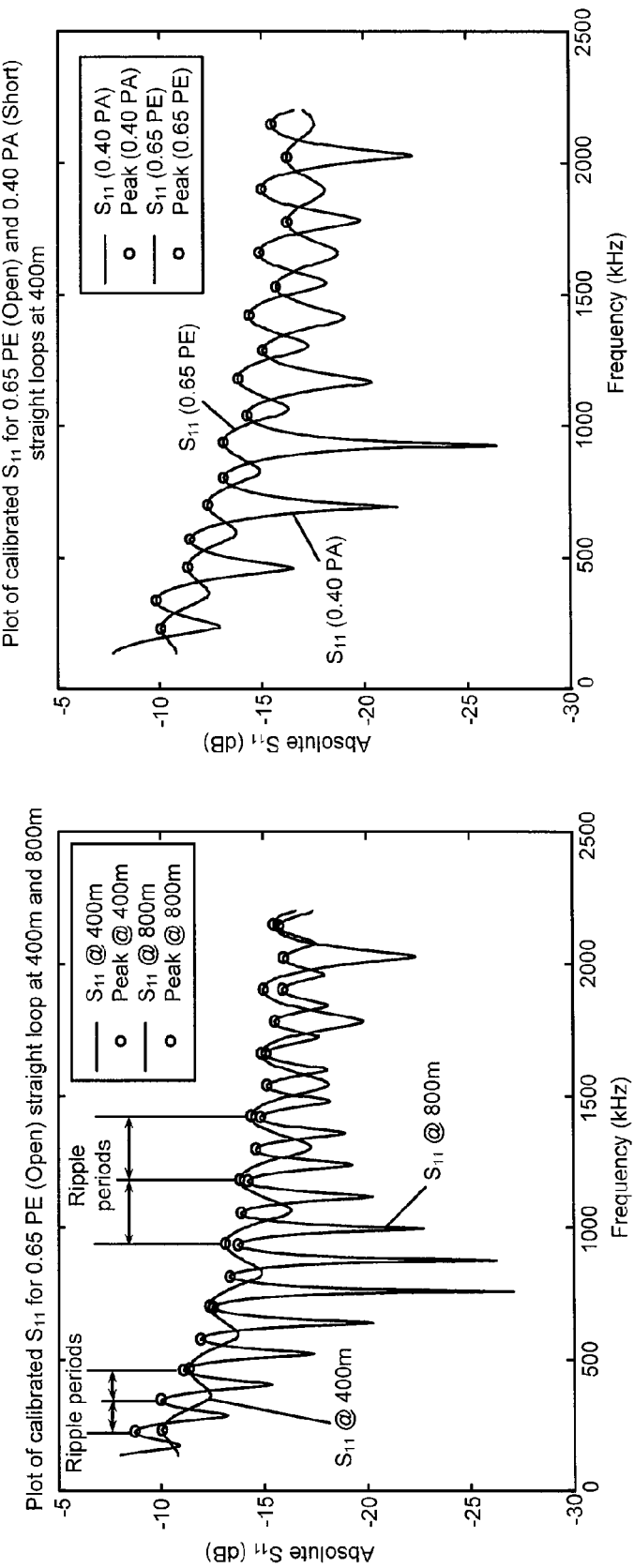
FIGS. 5 and 6 depict various plots of the $S_{11}$ signal as a function of frequency.
Figure 6:
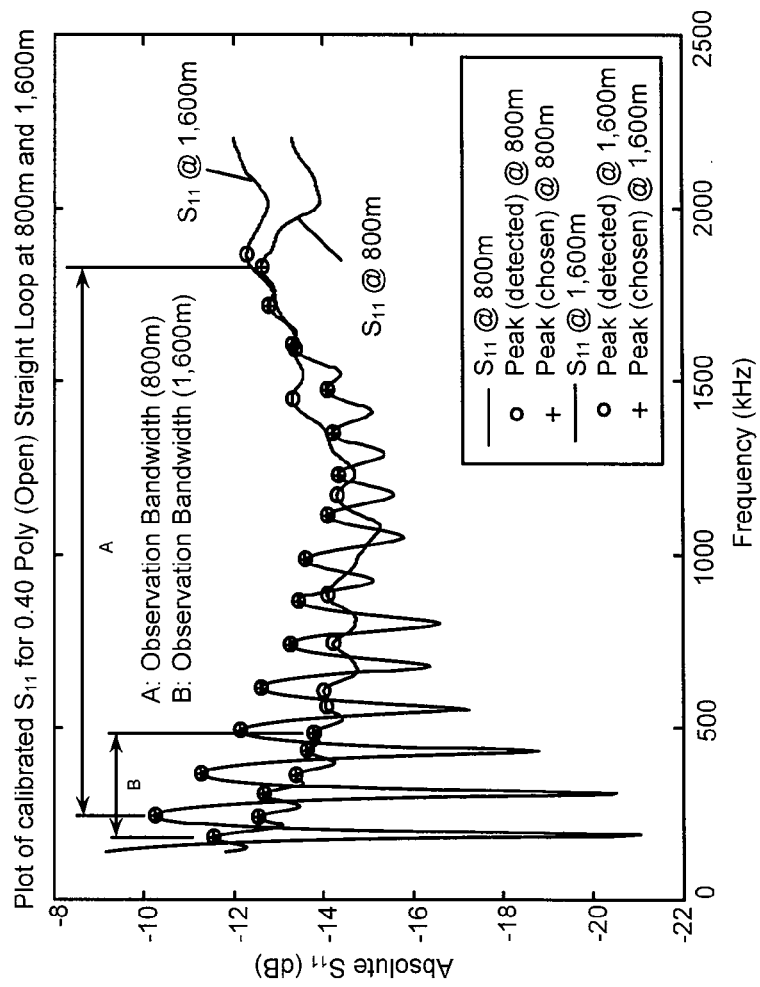
Figure 9:
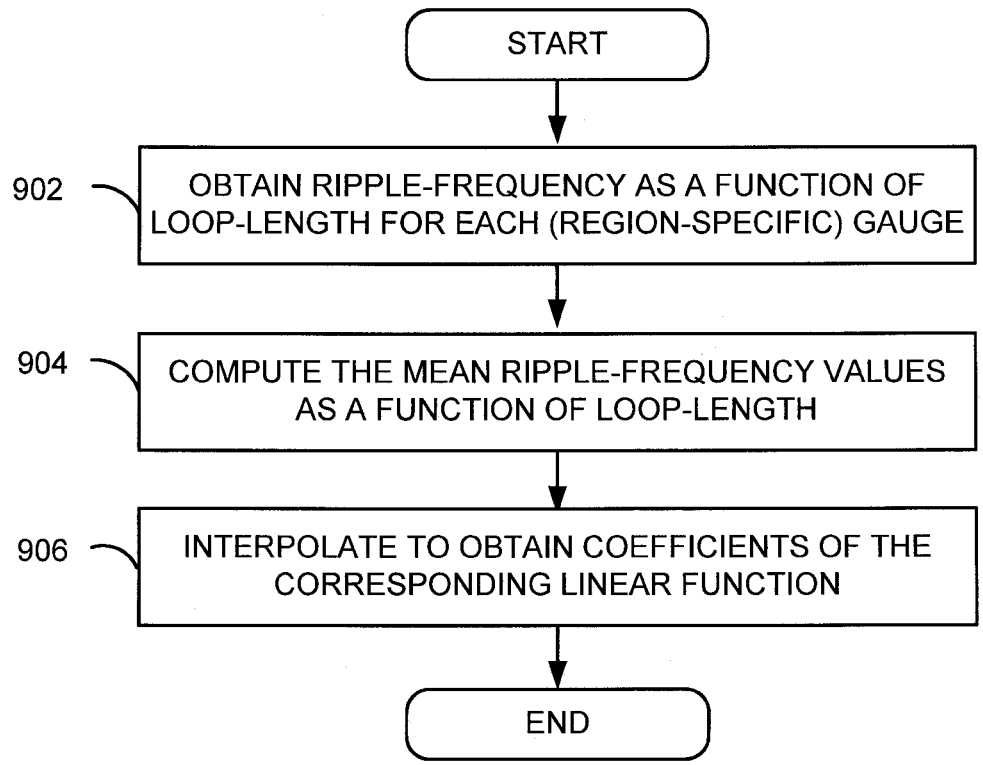
FIG. 9 is a flowchart for one embodiment of a training phase used in the estimation of loop length as depicted in FIGS. 8A-B.

Reference is made to FIGS. 5 and 6, which depict various plots of the $S_{11}$ signal as a function of frequency. As depicted in FIG. 5, the period of the ripples (observed in the amplitude of the $S_{11}$ signal) depends on the loop length and is largely independent of the loop gauge and loop termination. Further, as depicted in FIG. 6, a greater level of attenuation in the $S_{11}$ signal is observed at higher frequencies for longer loops. As a result, the $S_{11}$ signal experiences ripples with consistent periods at lower frequencies for a relatively small bandwidth. Thus, for exemplary embodiments, the observed bandwidth of the input signal is identified and restricted in order to observe a true ripple period. Generally, the process for estimating loop length involves a training phase, which is performed in order to obtain region-specific coefficients. This information is later used when the loop under test is being analyzed. Reference is briefly made to FIG. 9, which is a flowchart for the training phase. During the training phase, the frequency of the ripple experienced by the $S_{11}$ signal as a function of loop length is obtained for all loop gauges available (step 902). This serves as a reference or template for later estimating the loop length. Based on this information, the mean ripple frequency is computed as a function of loop length (step 904). Next, interpolation is performed to obtain coefficients of a corresponding linear function (step 906). It should be noted that the training phase is only performed once as the resulting coefficients may be stored for future reference.

Figure 7:
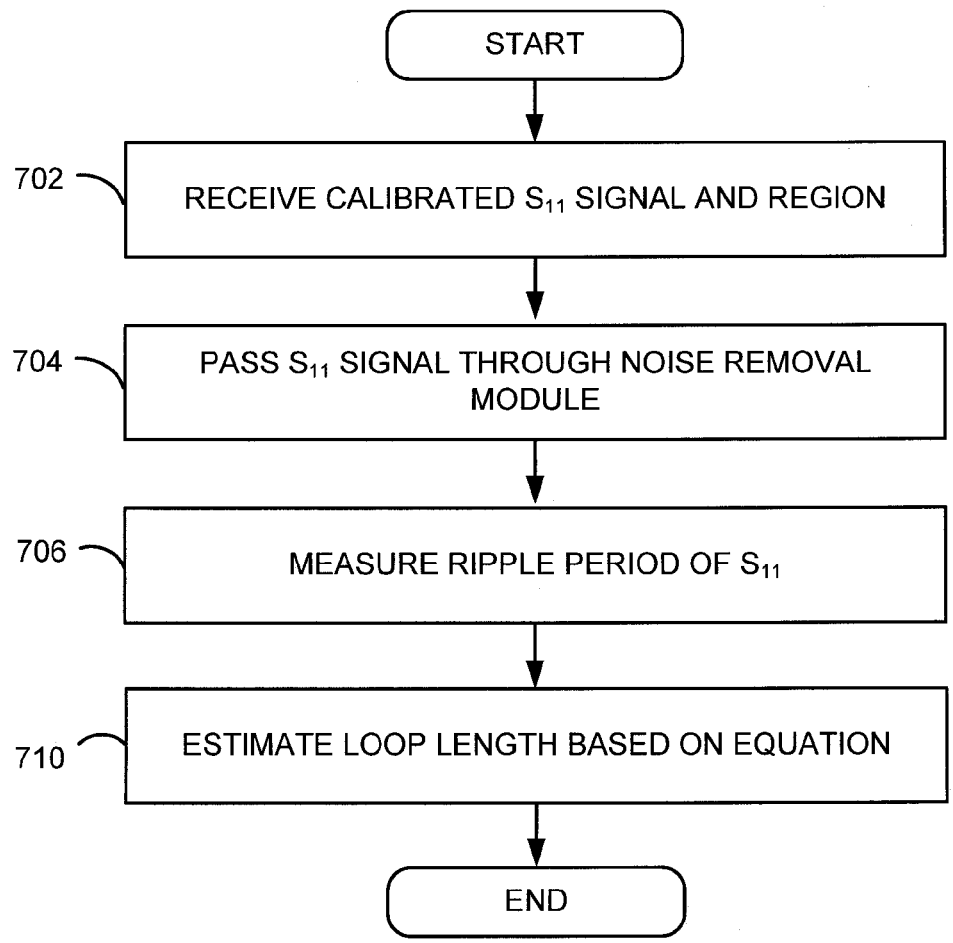
FIG. 7 is a flowchart for an embodiment for estimating the loop length based on characteristics of the $S_{11}$, as depicted in FIG. 4A-B and as described in relation to FIGS. 5-6.

Reference is now made to FIG. 7, which is a flowchart for an embodiment for estimating the loop length based on characteristics of $S_{11}$, as depicted in FIG. 4A-B and as further described in relation to FIGS. 5-6. Beginning in step 702, the calibrated $S_{11}$ parameter obtained through SELT-FDR is received, and the relevant region or country associated with the loop environment is specified. In the context of the embodiments described herein, the region will generally be specified as either "North America" or "Japan." It should be emphasized, however, that the regions are not limited to these two designations and that the concepts described herein can be applied to other regions as well.

In accordance with some embodiments, the $S_{11}$ signal may be first passed through a noise removal module (step 704) in order to remove or reduce any noise that may affect later estimations made based on the $S_{11}$ signal. In step 706, the ripple period associated with the $S_{11}$ signal is measured. In step 710, an estimated loop length is then calculated.

Figure 8A:
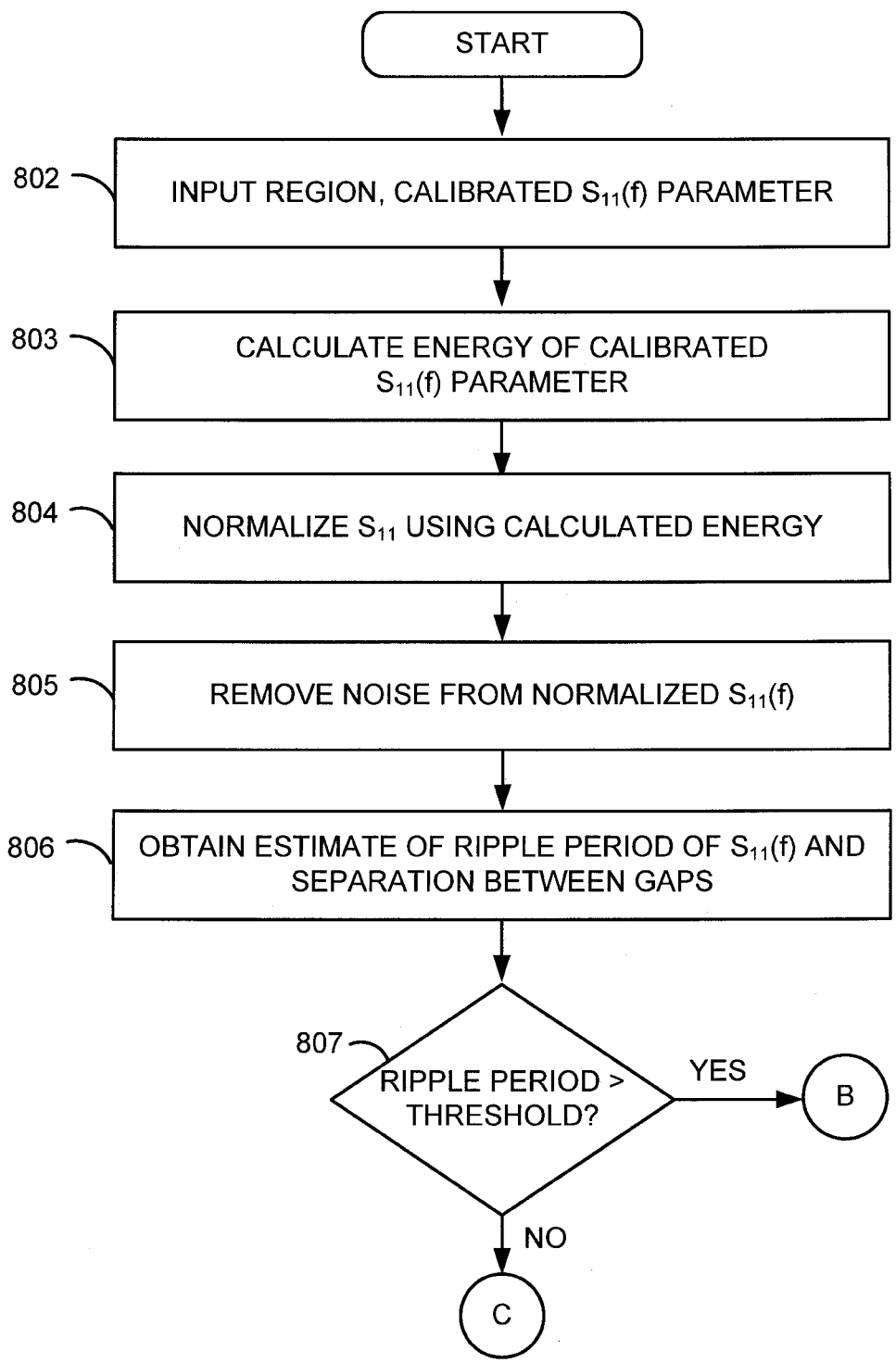
FIGS. 8A-C depict another embodiment of a process for estimating the loop length as shown in FIGS. 4A-B.
Figure 8B:
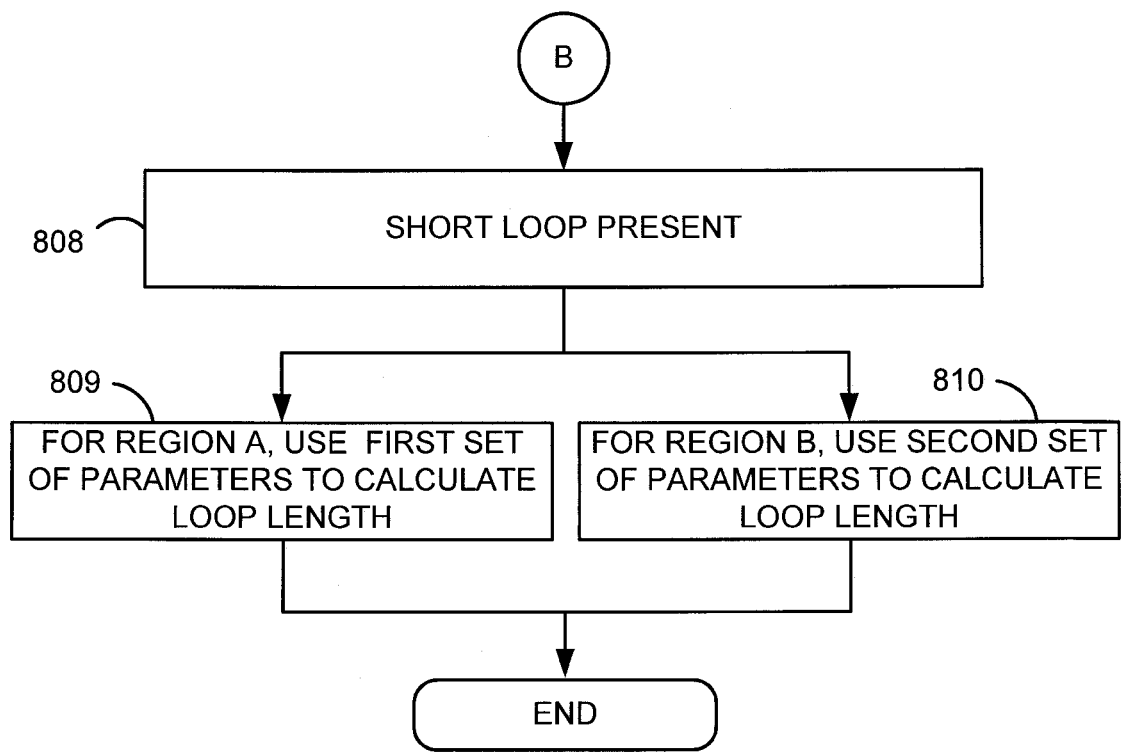

Reference is made to FIGS. 8A-B, which depicts another embodiment of a process for estimating the loop length. FIGS. 8A-B illustrates one implementation of the steps shown in FIG. 7. As described earlier, the loop length estimation is based on the periodicity of the ripples observed in the amplitude of the calibrated echo in the frequency domain. This feature depends largely on the loop-length and is for most part insensitive to the gauge and termination of the loop. Beginning in step 802, the region (e.g., Japan vs. North America) is specified and the calibrated $S_{11}(f)$ parameter is provided. In steps 803 and 804, the energy of the calibrated $S_{11}(f)$ parameter in the relevant VDSL band is calculated and used to normalize the calibrated $S_{11}(f)$.

Figure 10:
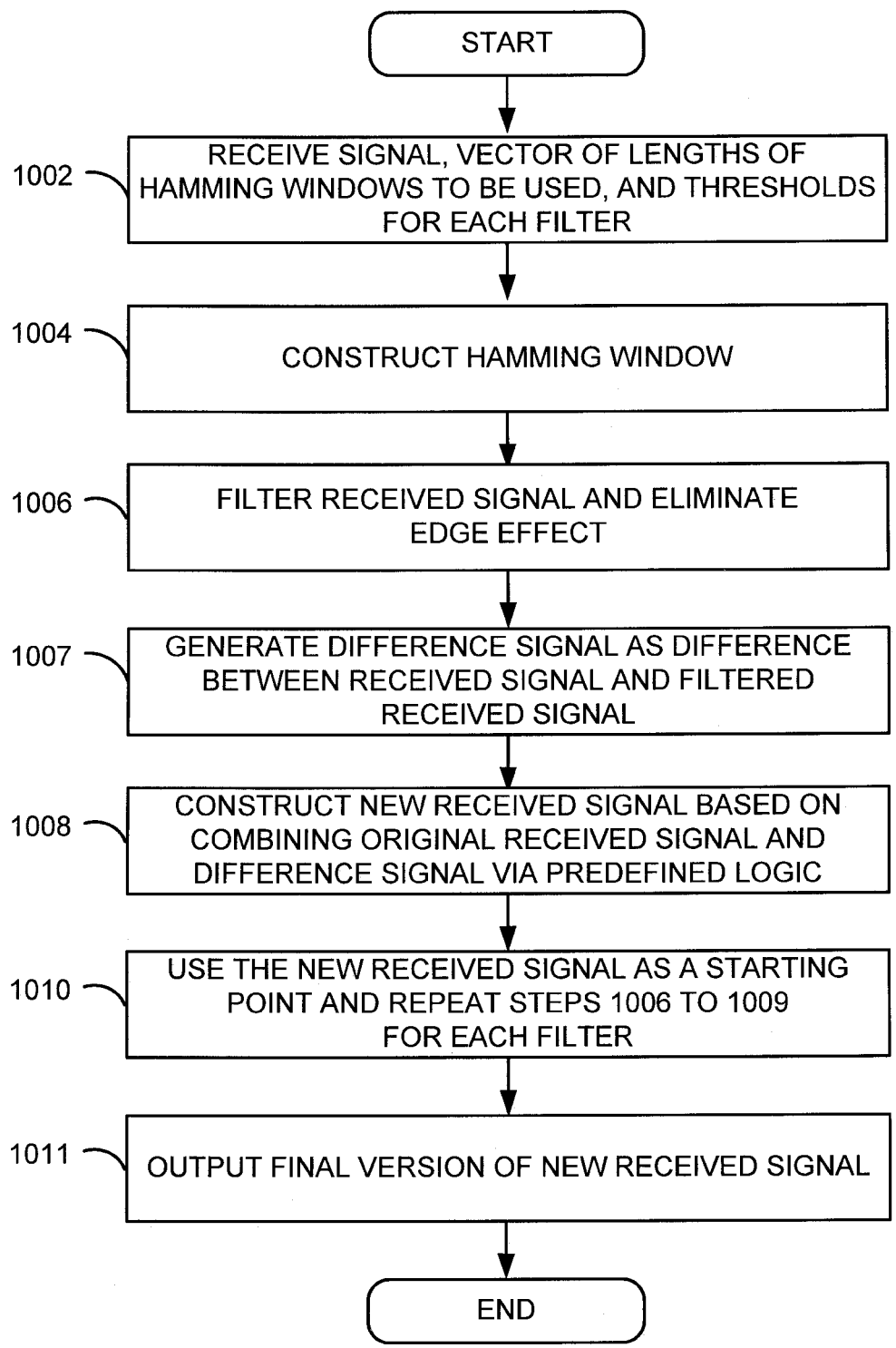
FIG. 10 is one embodiment of the noise removal module shown in FIGS. 8A-B.

In step 805, the normalized $S_{11}(f)$ is passed through the noise removal module. For some embodiments, the noise removal module may incorporate three Hamming windows of lengths 51, 15 and 7 for filtering with a threshold of $2\times10^{-4}$ for each filter. FIG. 10 provides an implementation of the noise removal process that may be utilized. As depicted in steps 1002-1011, signal processing is generally performed on the normalized $S_{11}$ response in order to eliminate noise, which can affect the accuracy of loop length estimates. While FIG. 10 shows signal processing using Hamming Windows, it should be noted that other means for removing noise from the normalized $S_{11}$ signal may be incorporated as well. After $S_{11}$ is filtered, peak detection is performed via a primary peak detection module in order to obtain a preliminary ripple-period estimate and separation/gaps between consecutive peaks (step 806).

Figure 8C:
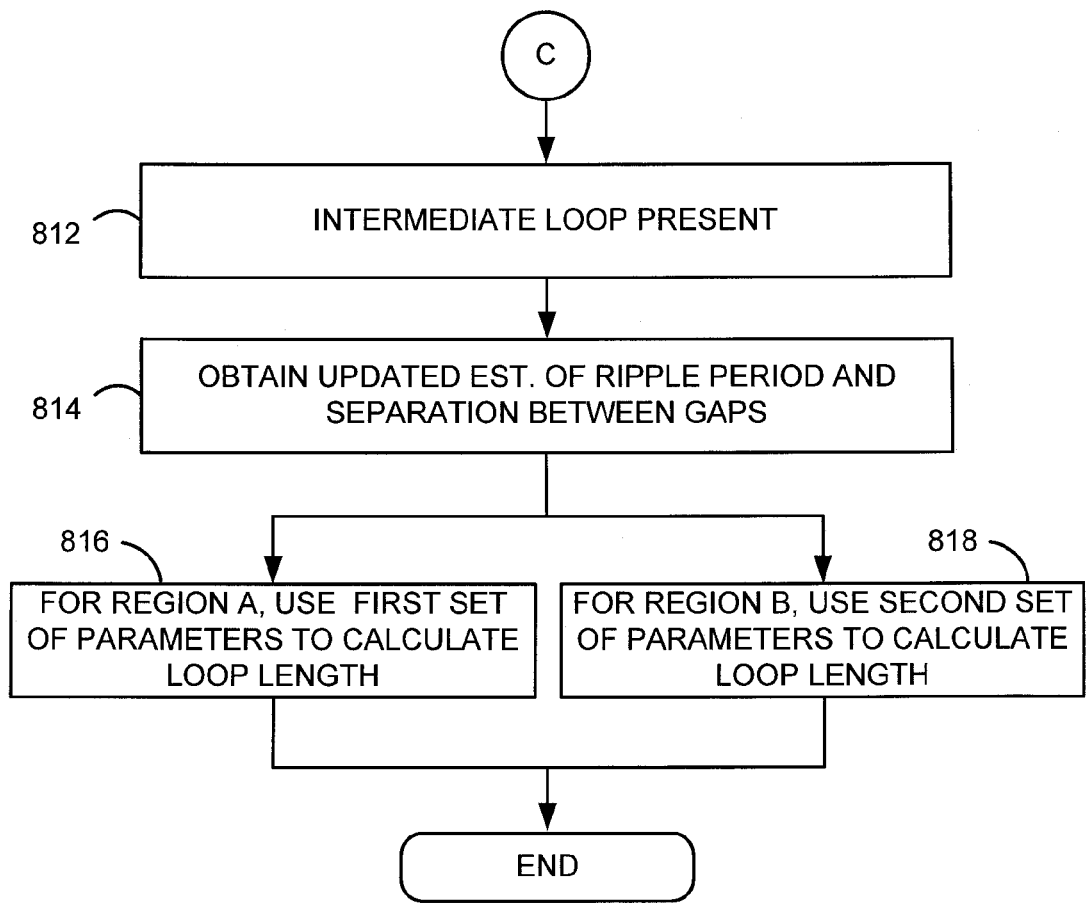

Referring back to FIGS. 8A-C, in decision block 807, if the preliminary ripple-period estimate is greater than a predetermined threshold (node B), the determination is made that a short loop is present (step 808). Next, depending on the specified region (e.g., North America vs. Japan), different sets of values are used to calculate the loop length (steps 809, 810). As a non-limiting example, the predetermined threshold is set to 60, and the following equation is used to calculate the loop length using the ripple-period (rpl_prd):

$$\text{Loop\_Length} = k\left(\frac{\left(\frac{1}{\text{rpl\_prd}} + a\right)}{b}\right)$$

where k=1, a=0.00002722, b=0.00004558, and the loop length is in meters if the region is "Japan" (step 809). If the region is specified as "North America", then different values are used: k=3.281, a=0.00000641, b=0.00004708, and the loop length is in feet (step 810).

Referring back to decision block 807, if the preliminary ripple-period estimate is less than or equal to a predetermined threshold (node C), the determination is made that an intermediate loop is present (step 812). The normalized $S_{11}$ parameter prior to noise removal is used to obtain an updated estimate of the ripple period and gaps. The gaps are then passed through a secondary peak detection module to get a final ripple period estimate (rpl_prd) (step 814). Next, depending on the specified region, different sets of values are used to calculate the loop length (steps 816, 818). The loop length is calculated using the same equation set forth for steps 809 and 810.

Figure 11:
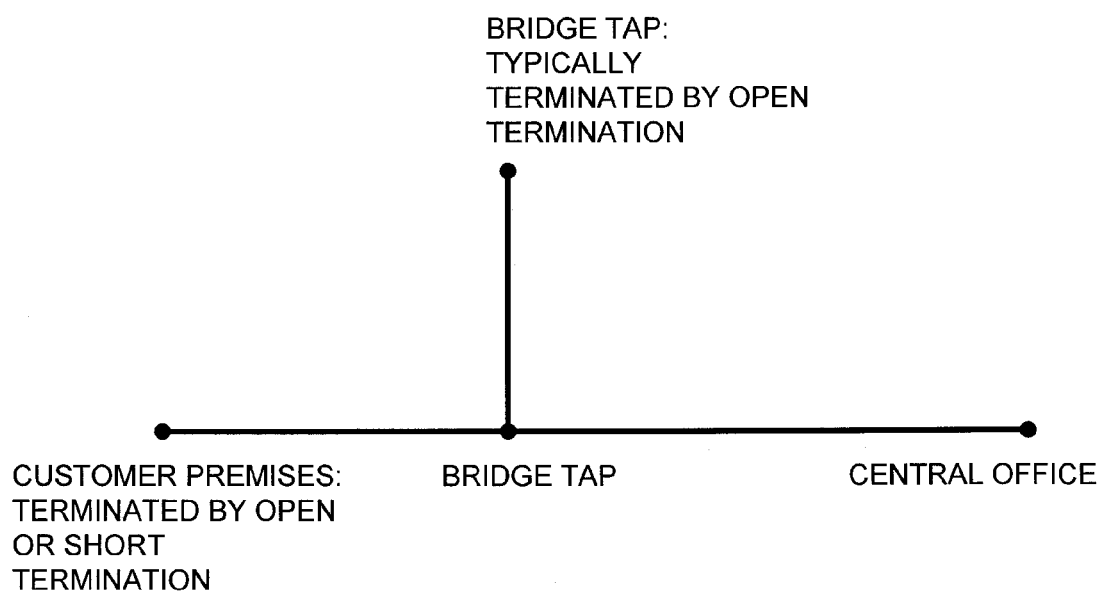
FIG. 11 illustrates the presence of a bridge tap between the CO and CP.

Exemplary embodiments for detecting bridge tap terminations are now described. With reference to FIG. 11, the presence of bridge taps between the central office and customer premises can affect the quality of service in a given subscriber loop. As such, methods for detecting bridge taps comprise detecting and discarding estimates where the results of other estimations (e.g., loop-length estimation, gauge-detection, and termination detection) are likely erroneous or misleading. It should be emphasized that this feature improves the reliability of the loop analysis.

Figure 12A:
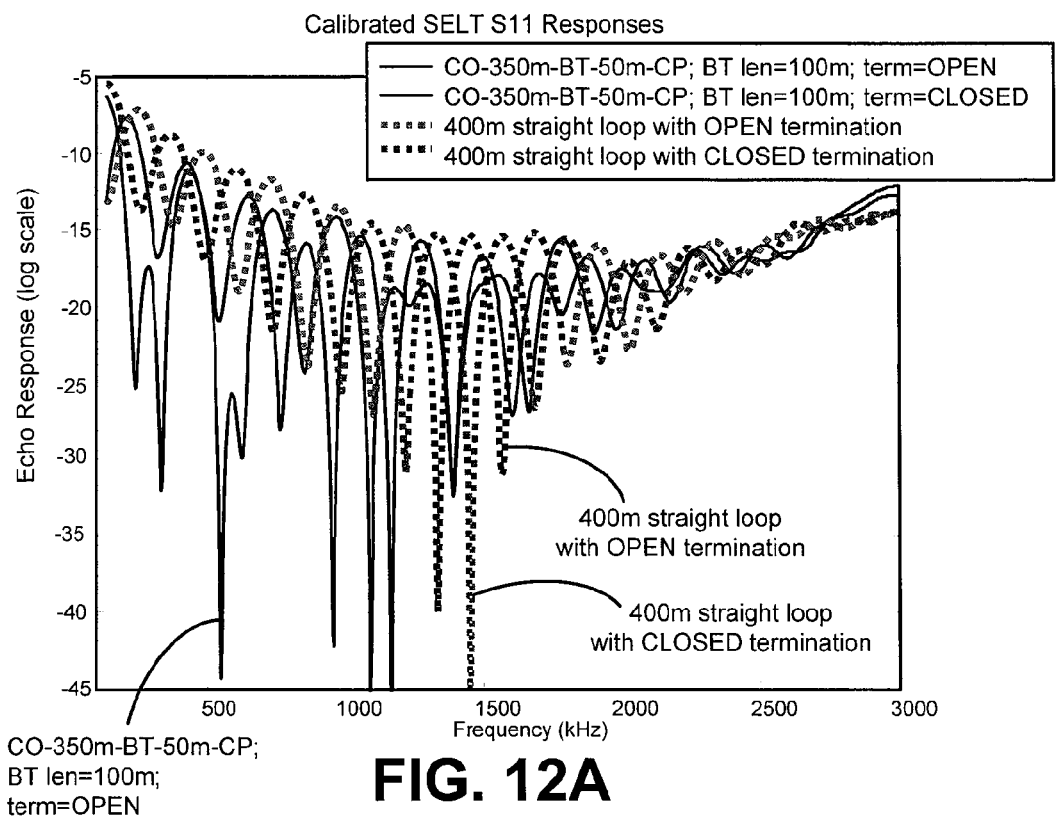
FIG. 12A illustrates the impact of a bridge tap on the absolute value of the calibrated echo ($|S_{11}(f)|$) when compared to straight loops.

The detection of a bridge tap loop relies on the presence of a number of characteristics that are ideally not exhibited by straight loops. For purposes of nomenclature, these characteristics will be referred to as "differentiating features" or "differentiating characteristics" in the context of detecting bridge taps. With reference to FIG. 12A, the presence of a bridge tap introduces abrupt changes in the amplitude and periodicity of observed ripples in the absolute value of the calibrated echo ($|S_{11}(f)|$) when compared to straight loops. These abrupt changes in $|S_{11}(f)|$ are the result of multiple reflections in the received echo.

Figure 12B:
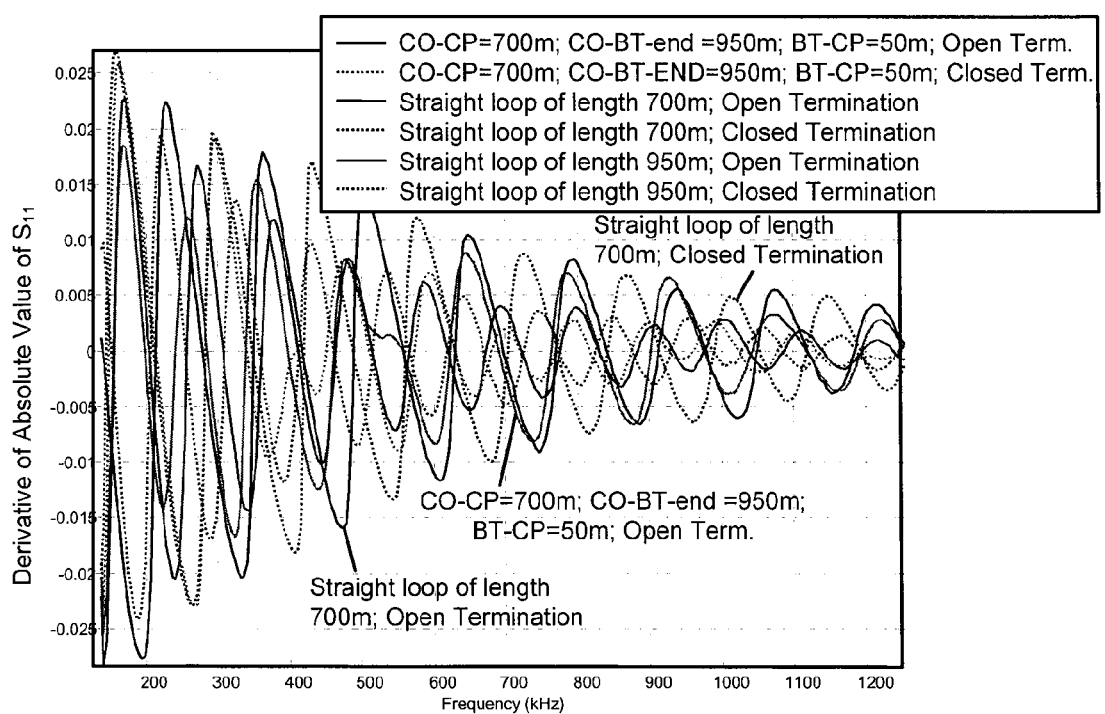
FIG. 12B illustrates how the inflection points in $|S_{11}(f)|$ translate to local maxima below 0 (or local minima above 0) in the derivative (first difference).

The presence of a BT introduces inflection points in $|S_{11}(f)|$, which are ideally not observed in straight loops responses. Accordingly, the presence of such differentiating features are monitored in order to determine whether a bridge tap exists. In particular, differentiating factors that relate to the maxima and minima of the absolute value of the calibrated echo and its derivative are examined. As illustrated in FIG. 12B, the inflection points in $|S_{11}(f)|$ translate to local maxima below 0 (or local minima above 0) in the derivative (first difference).

In accordance with exemplary embodiments, the presence of the following differentiating factors/characteristics are monitored. The term "differentiating" is used as these features are used to differentiate a straight loop from a bridge tapped loop. The following differentiating factors may be monitored and used to determine the presence of a bridge tap:

1) a relevant minimum in the derivative of $|S_{11}(f)|$ with value greater than zero and both flanking minima less than zero;
2) a relevant maximum of the derivative of $|S_{11}(f)|$ with a value less than zero and both flanking maxima greater than zero;
3) an interval between two maxima in the derivative of $|S_{11}(f)|$ that is separated from the mean by more than the maximum of the specified fraction of the standard deviation or a specified number of samples;
4) an interval between two minima in the derivative of $|S_{11}(f)|$ that is away from the mean by more than the maximum of the specified fraction of the standard deviation or the specified number of samples;
5) a relevant maximum in $|S_{11}(f)|$ higher than its previous maxima by the specified tolerance; and
6) a relevant minimum in $|S_{11}(f)|$ having value greater than the specified threshold and with both flanking minima less than the specified fraction of its value.

It should be noted that pre-processing of $|S_{11}(f)|$ and its derivative may be performed in order to filter out spurious maxima/minima. The relevant bandwidth is then determined from the derivative of $|S_{11}(f)|$. While it is generally important to detect the presence of bridge taps, this requirement must be balanced with the need to limit the probability of erroneously flagging straight loops as bridge tapped loops. In some instances, the latter requirement is more important (from the customer's perspective) because for a large number of cases, the estimated loop length remains fairly accurate for a bridge tapped loop even if the presence of a bridge tap for that loop is missed.

Figure 13A:
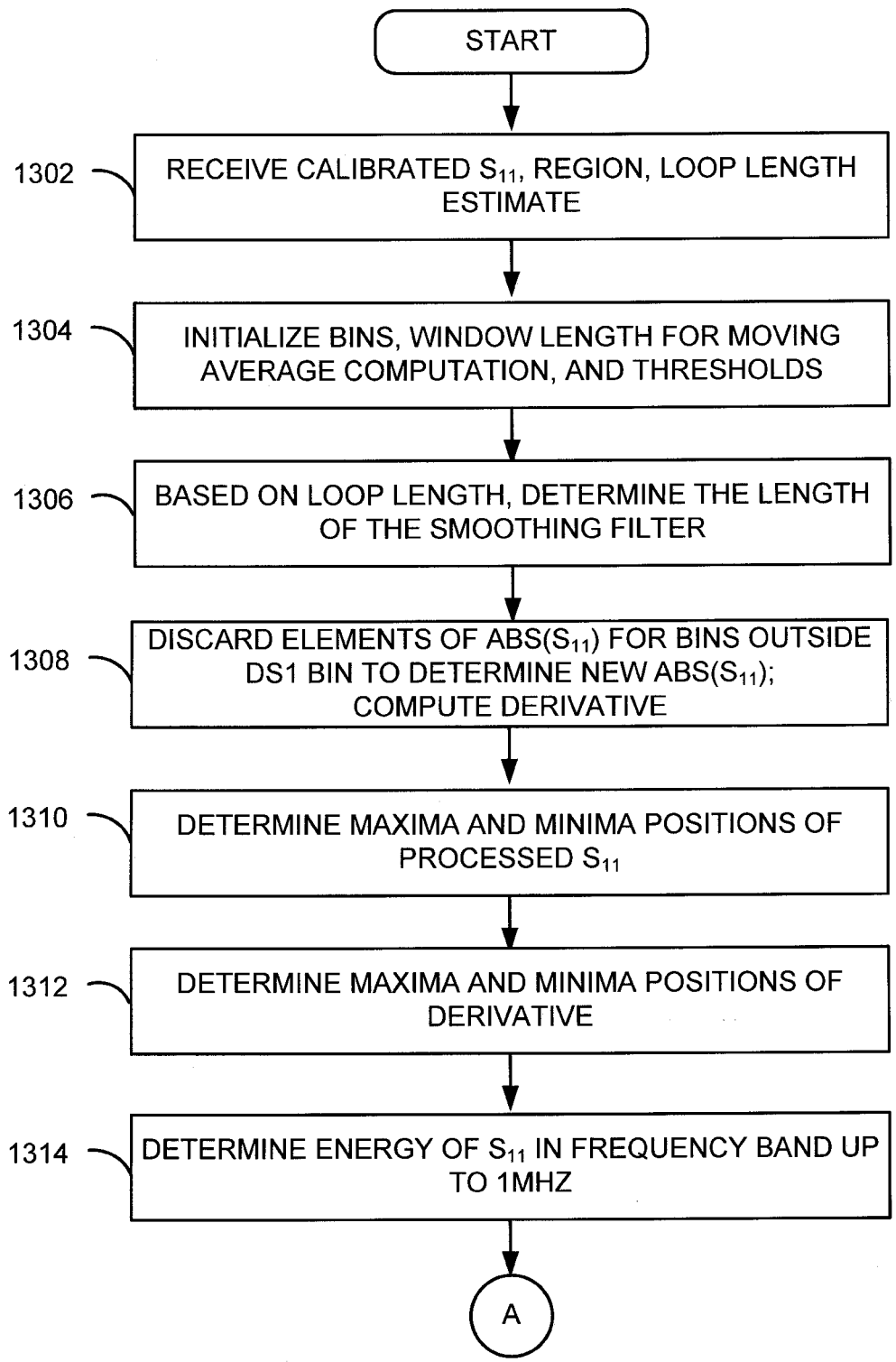
FIGS. 13A-C depict an embodiment for detecting the presence of bridge taps in a loop as shown in FIGS. 4A-B.
Figure 13B:
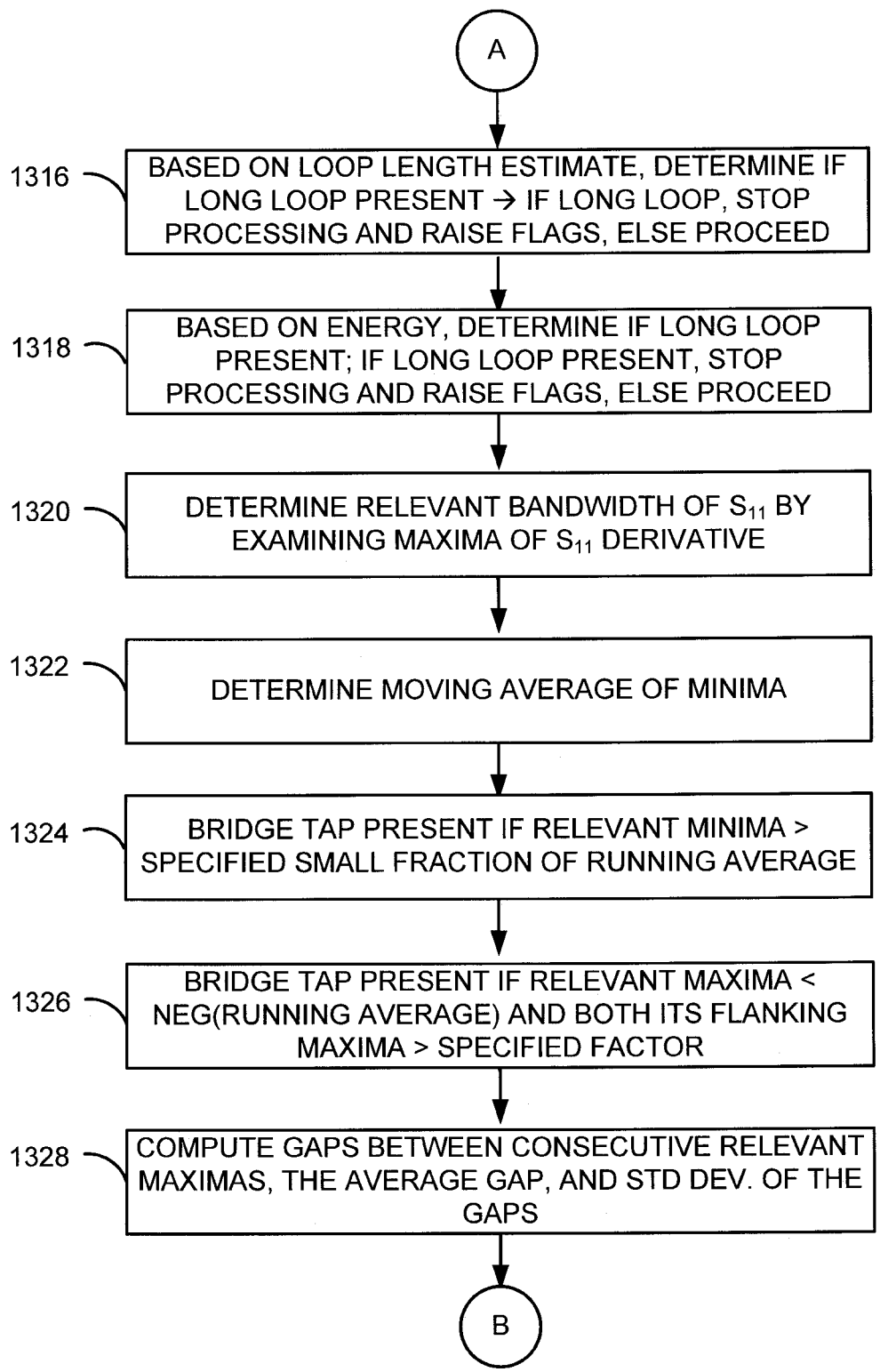
Figure 13C:
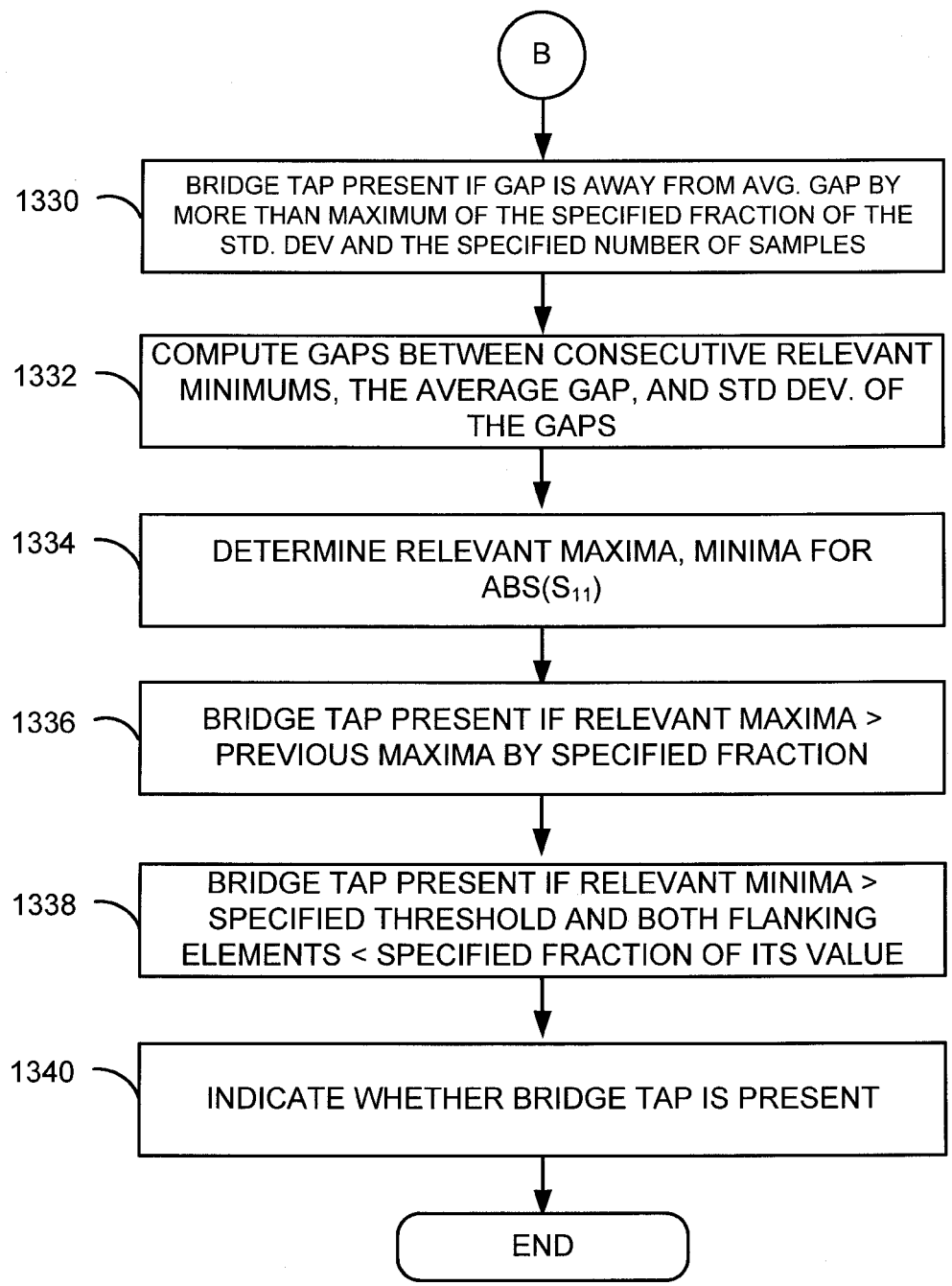

Based on the foregoing, exemplary embodiments for detecting the presence of bridge taps are now described. Reference is made to FIGS. 13A-C, which depict an embodiment for performing the process discussed above. For preferred embodiments, the following inputs are provided: a calibrated $S_{11}(f)$; a loop length estimate; and the region of deployment (step 1302). Next in step 1304, initialization is performed whereby the bins, window lengths, and thresholds is performed. In particular, the bins that define the edges of the DS1 frequency band and the 1 MHz bin are initialized. The window is used for performing a moving average. Further, the appropriate region-specific thresholds and tuning parameters are obtained. (See Tables 1 and 2 below.) In step 1306, the length of the smoothing filter is determined based on the loop length. Filtering is performed to remove any unwanted noise from $S_{11}$.

The determination of whether the loop length estimate is inconsistent is made by correlating the loop-length estimate with an intrinsic parameter of the calibrated FDR echo that varies with loop-length but is yet independent of the loop-length estimate, namely, the 1 MHz band energy. Regions of inconsistency are defined in the 1 MHz band energy vs. true loop-length plane and any calibrated FDR echo for which the pair of 1 MHz band energy and estimated loop length values falls within a region of inconsistency is flagged accordingly. Exemplary embodiments for performing these steps include the use of various thresholds and tolerances that are carefully tuned to increase the probability of correct detection while at the same time limiting the probability of erroneously flagging a straight-loop as a BT-loop.

Based on the foregoing, if the loop is either too long or if the loop length estimate is inconsistent, then processing stops as an estimate of the termination type might yield an erroneous result. If the loop length is not too long and loop length estimate appears reliable, however, processing continues. A bridge tap is present if any of the differentiating factors listed earlier are exhibited. For some embodiments, a flag (e.g., BT_flag) may be set to indicate the presence of a bridge tap.

In step 1308, elements of the $S_{11}$ response that fall outside the DS1 bin are discarded or truncated, and the derivative for $S_{11}$ is computed. In steps 1310 and 1312, the maxima and minima of $S_{11}$ and its derivative are determined and stored. The energy of $S_{11}$ in the band up to 1 Mhz is computed (step 1314). In step 1316, based on the loop length estimate, an indication is given (such as a flag) that a long loop is present. Processing then stops. If the loop length estimate itself is below a predetermined threshold, then the energy of $S_{11}$ is examined to determine whether a long loop may nevertheless be present (in the event of an erroneous loop length estimate) (step 1318). In step 1320, the "relevant" bandwidth is determined based on the examining the identified maximums. In step 1322, the relevant minima along with a running average of the minima are calculated. At this point, an indication is given that a bridge tap is present if one of the relevant minimums is greater than a predetermined fraction of the running average.

An indication is also given if one of the relevant maximums is less than a predetermined fraction of negative[absolute value of the running average for the maxima] and both flanking maxima are positive (step 1326). In step 1328, various statistics, including the gaps between consecutive values of relevant maxima, the average of these gaps, and the standard deviation of the gaps are computed and used in determining whether a bridge tap is present (step 1330). Similar steps are performed for relevant minimums where gaps between consecutive points are identified, and statistical analysis is performed (steps 1332-1338).

Based on the various steps described above, a determination is made on whether a bridge tap is present between the central office and the customer premises on the subscriber loop. As described above, the analysis is based on various differentiating features found in the calibrated $S_{11}$ response such as the identification of relevant minimums and maximums and other peaks that flank these values. The analysis further involves statistical analysis with respect to these points.

Exemplary methods for determining the loop termination type are now described. Generally, determining the termination type of a loop involves determining whether the end of the loop comprises a short or open termination, assuming that the loop is a straight loop (i.e., not a bridge tapped loop) and that the loop is not a long loop. Generally a loop length greater than Threshold B (e.g., 6,600 ft) is considered to be a long loop for North American loops. A loop greater than Threshold Y (e.g., 2 km) is considered to be a long loop for Japanese loops. It should be emphasized that while the embodiments below are described in the context of the North American and Japanese regions, the concepts described herein can be applied to loops in other regions as well.

Figure 14:
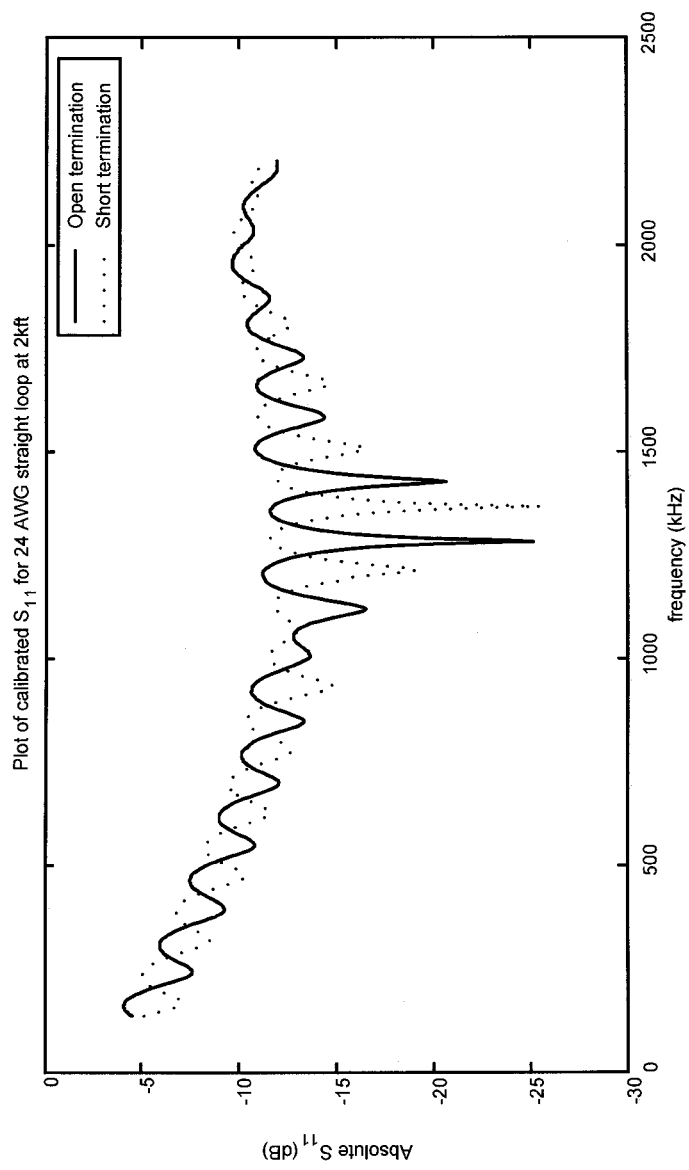
FIG. 14 shows the dependence of the amplitude of the reflected signal on different termination types.

The loop termination type is also generally made based on a priori knowledge of the loop gauge. The $S_{11}$ signal is utilized to determine the loop termination type because the phase of the reflected signal (i.e., $S_{11}$ or echo response) depends on how the loop is terminated. Specifically, a straight loop terminated with a matched impedance ideally does not cause any echo, whereas a loop with either an open or short termination causes a reflection in the transmitted signal. The reflected signal suffers a phase inversion at the loop end if the loop end is short terminated. If the loop end is open terminated, the reflected signal does not suffer any phase inversion at the loop end. Accordingly, FIG. 14 illustrates the interleaved pattern in the amplitude of the S11 signal, caused due to the phase variation in the echo-response, corresponding to the two termination types. This is in contrast to the case of a matched termination, which ideally does not generate any echo.

Figure 15:
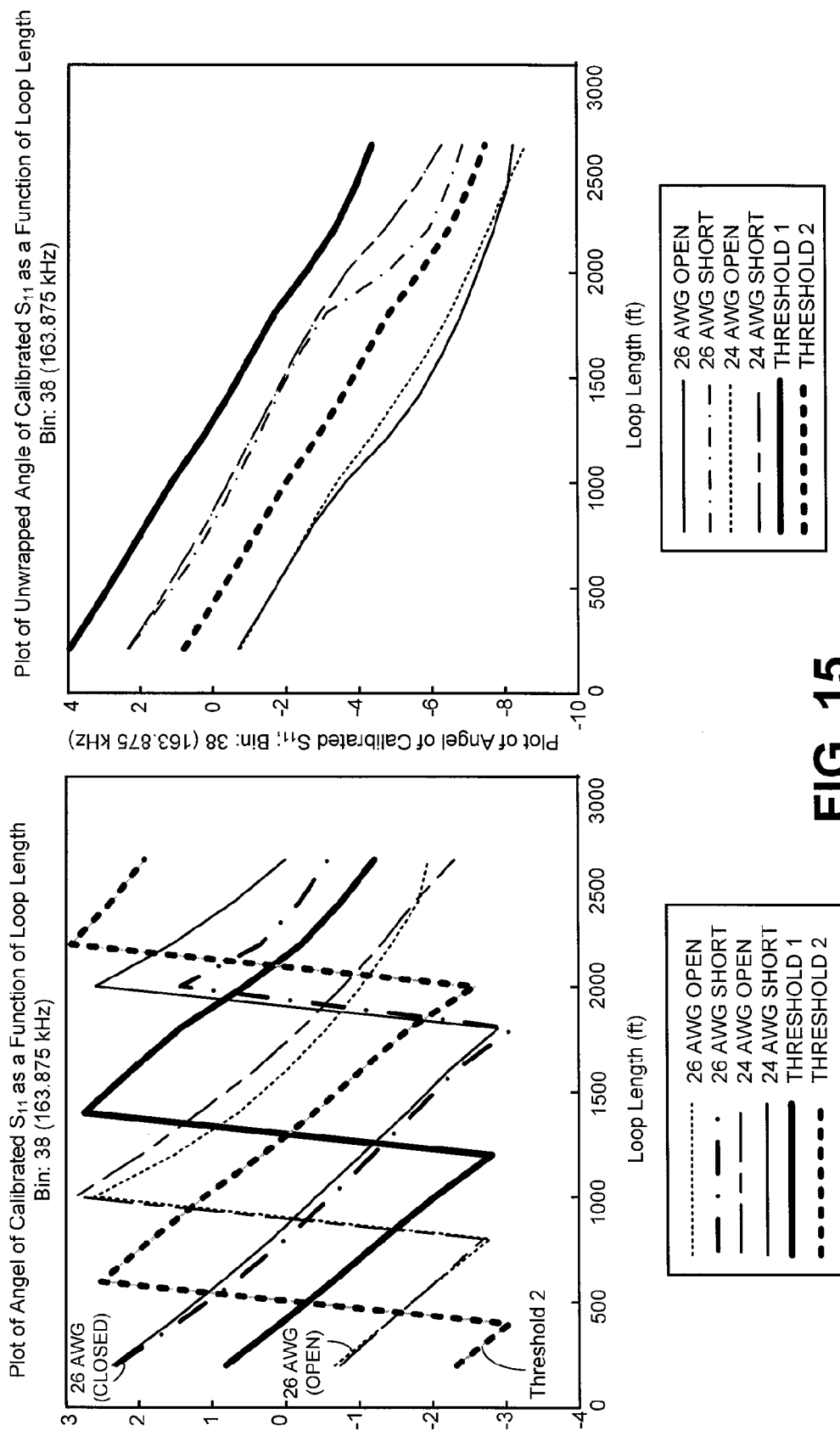
FIG. 15 shows various plots which illustrate wrapped and unwrapped phase of $S_{11}(f)$ corresponding to bin#38 for North American gauges as a function of loop-length.

Determining the termination type of a particular loop first involves a training phase whereby a set of frequency bins depicting consistent, calibrated $S_{11}$ phase responses as a function of loop-length is identified. FIG. 15 shows various plots which illustrate wrapped and unwrapped phase responses corresponding to bin#38 for North American gauges versus Loop-length. Next, the various thresholds (which will be region-specific) corresponding to the chosen bins are obtained. (The thresholds, however, may or ma not be gauge-specific.) For implementations involving North American and Japanese loops, it should be noted that a priori knowledge of the loop gauge is not mandatory for loop lengths less than or equal to Threshold X (e.g., 850 m) for Japan and Threshold A (e.g., 2,800 ft) for North America. That is, the thresholds are not gauge specific. However, knowledge of the loop gauge is necessary for loop lengths which exceed these values as the thresholds are gauge specific. Finally, independent decisions made with respect to one or more of the frequency bins are examined to determine the loop termination type.

Figure 16A:
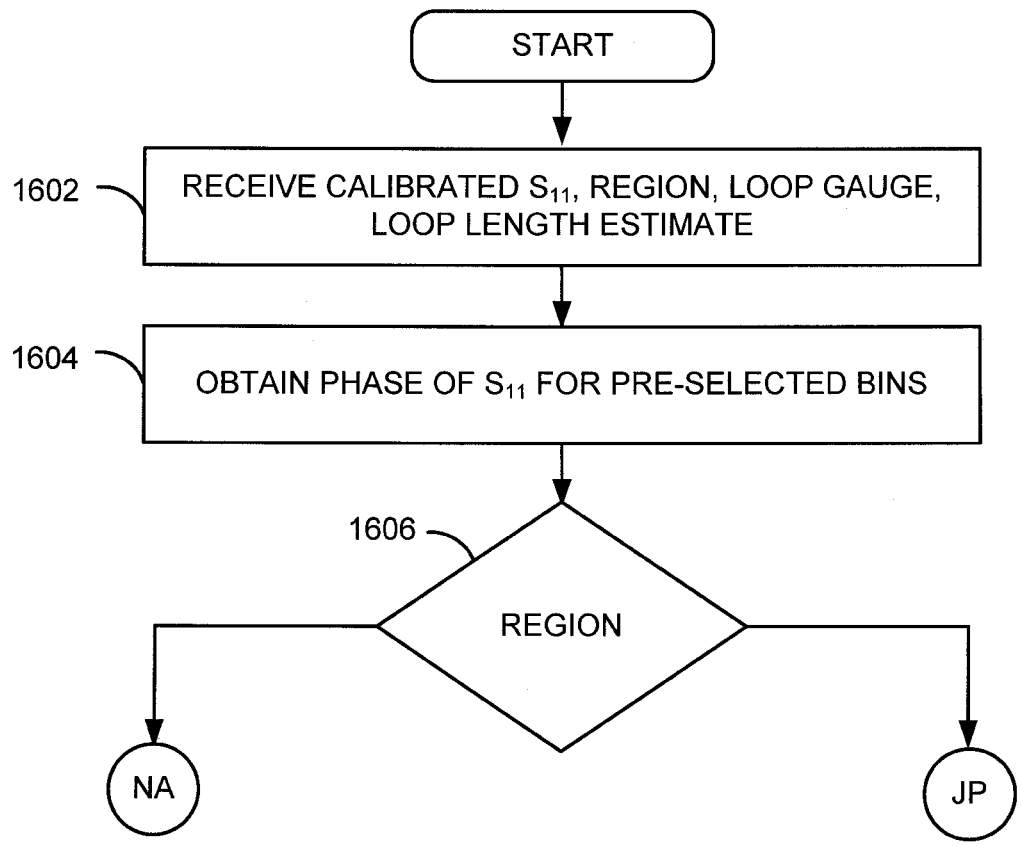
FIG. 16A-E is an embodiment for determining the loop termination as shown in FIGS. 4A-B.
Figure 16B:
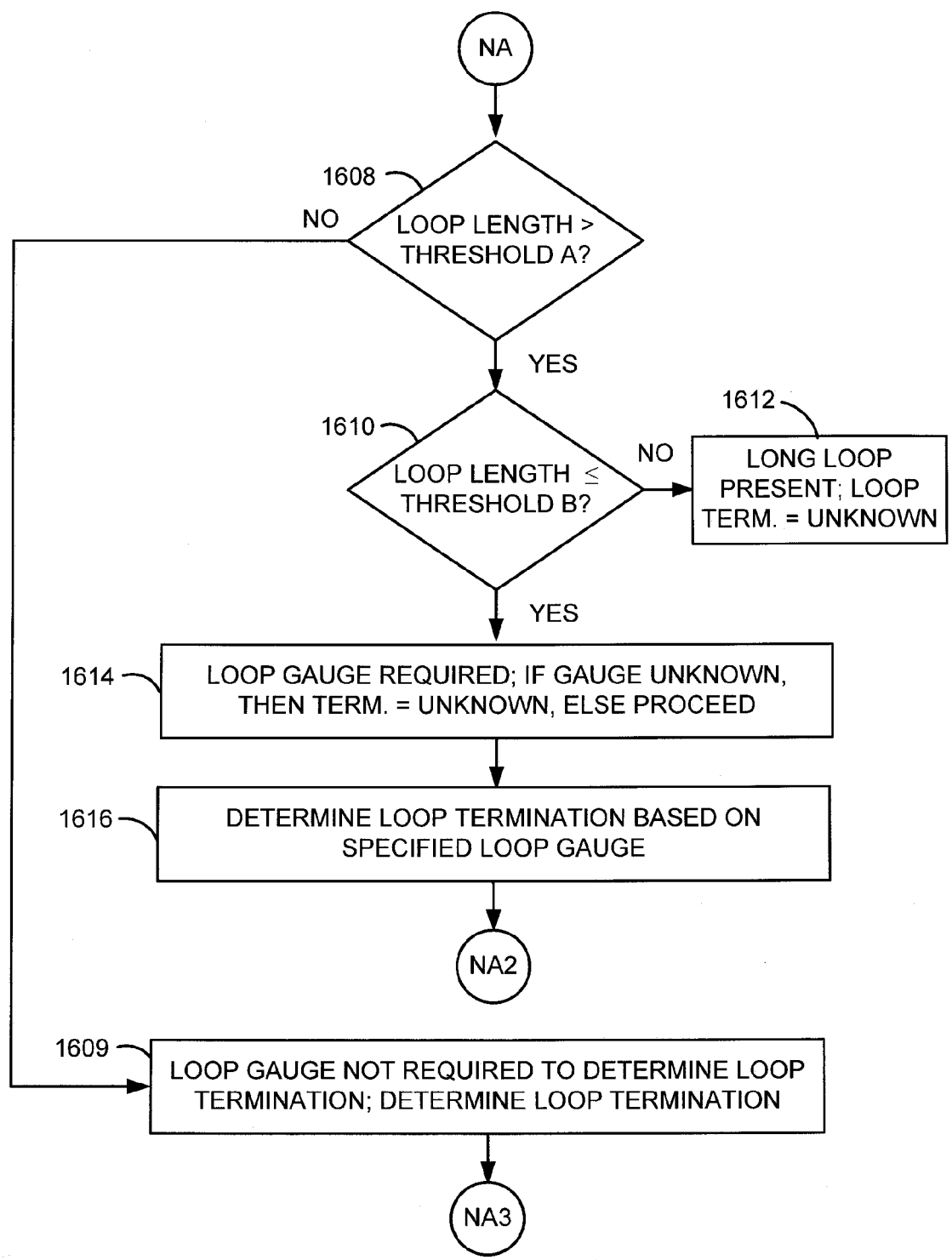
Figure 16C:
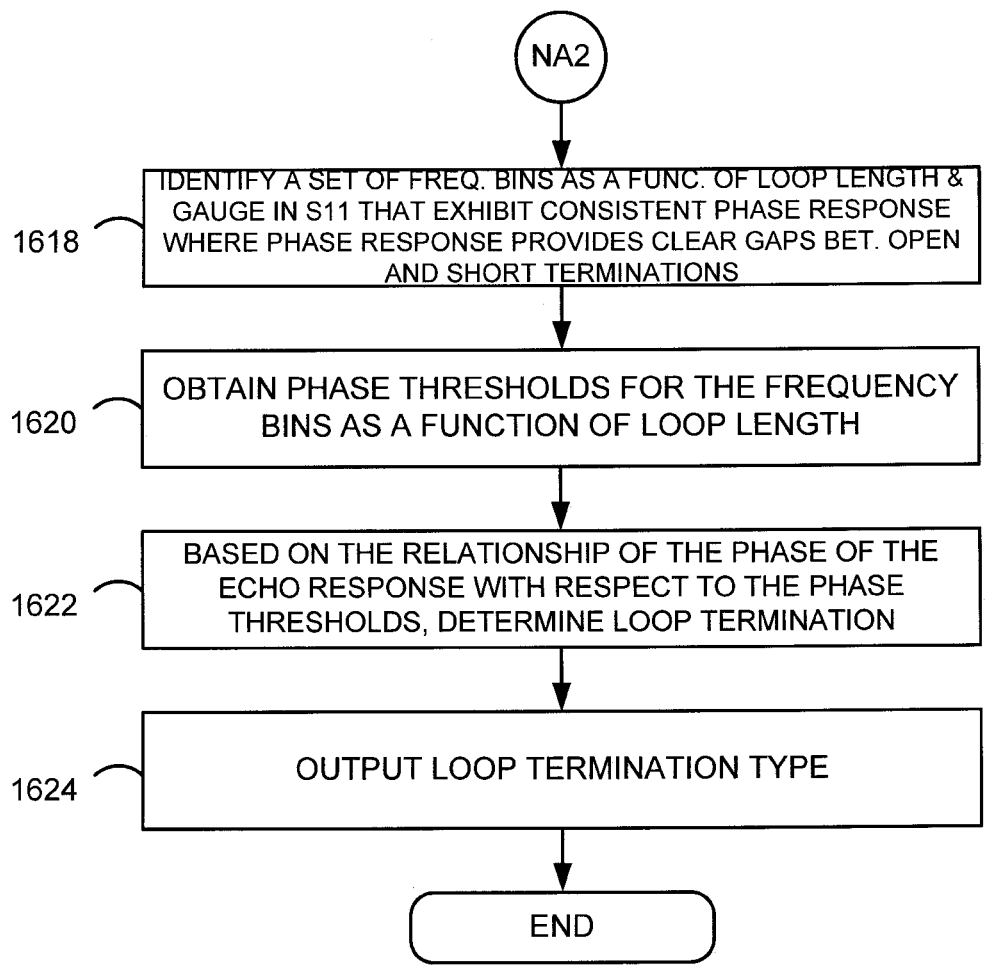
Figure 16D:
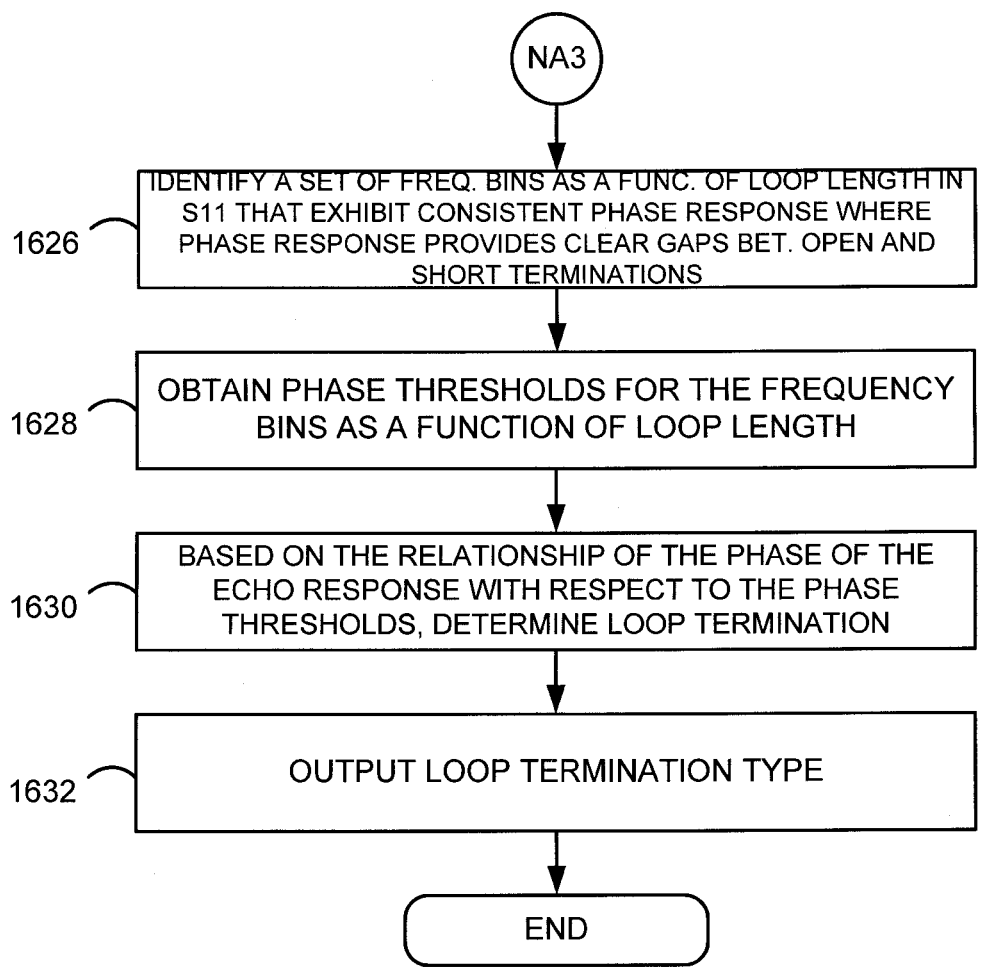
Figure 16E:
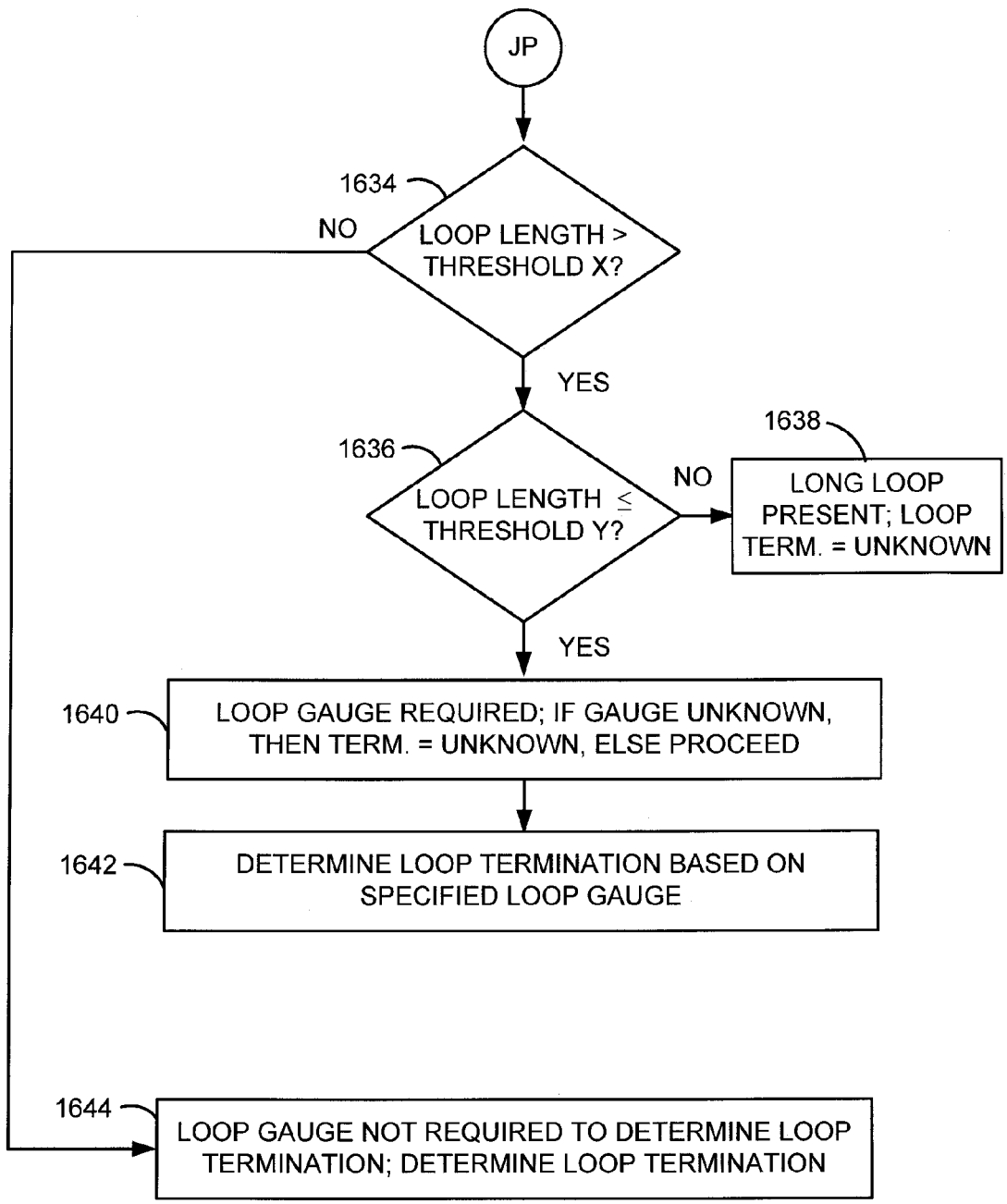

FIG. 16A-E is one embodiment for determining the loop termination in accordance with the concepts described above. As depicted in FIG. 16A, the following inputs are received in step 1602: a calibrated $S_{11}(f)$; a loop length estimate; the loop gauge; and the region of deployment. Information derived from a training phase helps identify frequency bins depicting consistent, calibrated $S_{11}$ phase responses as a function of loop-length. It should be noted that the training phase is not part of the actual loop termination process as this is only performed once in order to derive information used for determining the loop termination. Depending on the specified region (e.g., North America vs. Japan) (decision block 1606), the loop length estimate is compared to various thresholds to determine the loop termination type. For the embodiment depicted in FIGS. 16A-C, FIG. 16B illustrates the process involved if the specified region is North America, and FIG. 16E illustrates the process involved if the specified region is Japan.

With reference to FIG. 16B, a determination is first made if the loop length exceeds Threshold A (e.g., 2,800 ft) in decision block 1608. For embodiments involving North American loops, if the loop is not longer than Threshold A, the loop termination type can be made independently of the loop gauge (step 1609). If the loop exceeds Threshold A (e.g., 2,800 ft), then a check is made on whether the loop exceeds Threshold B (e.g., 6,600 ft) in decision block 1610. If the loop is longer than Threshold B, then processing stops as depicted in step 1612 since the measuring capabilities of the SELT-FDR analysis engine are exceeded. In such cases, the termination type is returned as "unknown." In step 1614, the particular loop gauge is required as the loop is greater than Threshold A. If the loop gauge is not known, then processing again terminates and the termination type is unknown. If the loop gauge is known, then processing continues (step 1616).

With reference to FIG. 16C, a set of frequency bins that exhibit a consistent phase response is acquired as a function of loop length and loop gauge (step 1618). A series of phase responses are considered to be consistent if they provide clear separations or gaps between open and short terminations. As discussed earlier, the phase of a reflected signal for an open termination will be out of phase with respect to the phase of a reflected signal for a short termination for the same loop length. Next in step 1620, thresholds for the frequency bins are obtained for various loop lengths. Based on the information discussed above, a correlation can be made such that the loop termination type can be identified (steps 1622, 1624). With reference to FIGS. 16D and 16A, if the loop length estimate is less than Threshold A, the loop gauge is not required. Steps similar to those discussed for FIG. 16C are followed (steps 1626-1632).

FIG. 16E depicts an implementation for Japanese loops. First, a comparison is made on whether the loop exceeds Threshold X (decision block 1634). In accordance with some embodiments, Threshold X may be set to a value of 850 m. If the loop length does not exceed Threshold X, then the loop termination type can be determined even if the loop gauge is unknown (step 1644). If the loop is a long loop (i.e., exceeds Threshold Y (e.g., 2 km for Japanese loops), then the termination type is returned as unknown (decision block 1636, step 1638). If the loop length falls between Threshold X and Threshold Y, then the loop gauge is required, otherwise processing terminates and the termination type is unknown (steps 1640, 1642).

Exemplary embodiments for determining the loop gauge are now described. Generally, information on the particular loop gauge can be valuable information as the loop gauge can be used to determine the data-rate that can be supported on a line. The loop gauge can also be used to guide decision-making in cases involving service disruption. As non-limiting examples, the loop gauge may be determined to be 24 AWG, 26 AWG for North American loops and 0.4 paper, 0.4 poly, 0.65 poly for Japanese loops.

Figure 17:
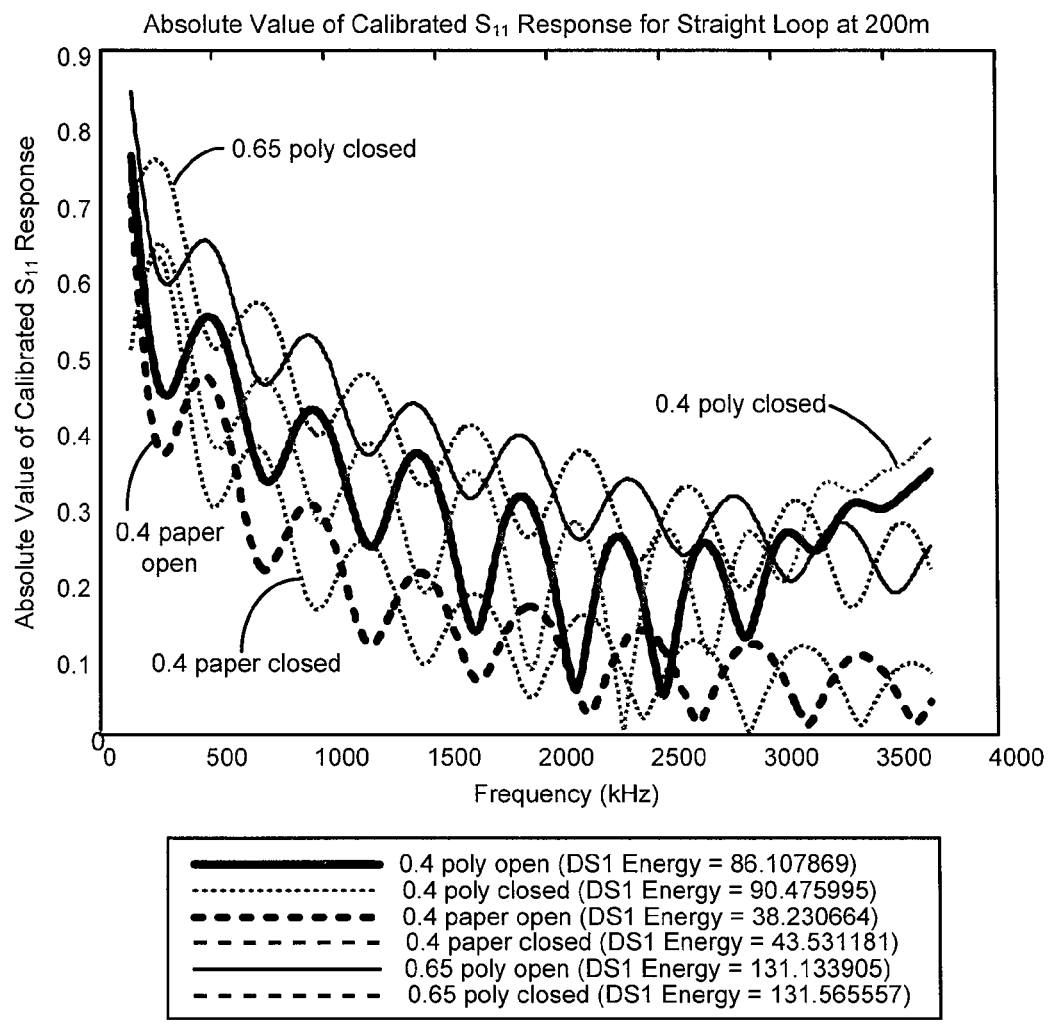
FIG. 17 is a plot of the absolute value for a calibrated $S_{11}$ response for a straight loop.

Through the $S_{11}$ response, the loop gauge may be determined based on the fact that for a given loop length, the gauge of a particular loop affects the amplitude of the calibrated echo signal. The absolute value for a calibrated $S_{11}$ response for a straight loop at 200 m is plotted as a function of frequency in FIG. 17. Thus, by analyzing certain characteristics of the FDR-SELT echo, thresholds can be incorporated to differentiate between different gauges for various loop lengths. Such FDR-SELT characteristics are dependent on the loop gauge and include the following: 1) the energy up to 1 MHz; 2) the envelope of maxima and minima; and 3) the span of the ripples of $S_{11}$. It should be noted that since any one feature by itself does not provide sufficient differentiation between different gauges across all frequencies and loop lengths, the loop gauge is determined based on a merging criterion of one or more individual decisions based on these characteristics. This helps to increase robustness via diversity if more than one feature is used to determine the gauge.

Figure 18A:
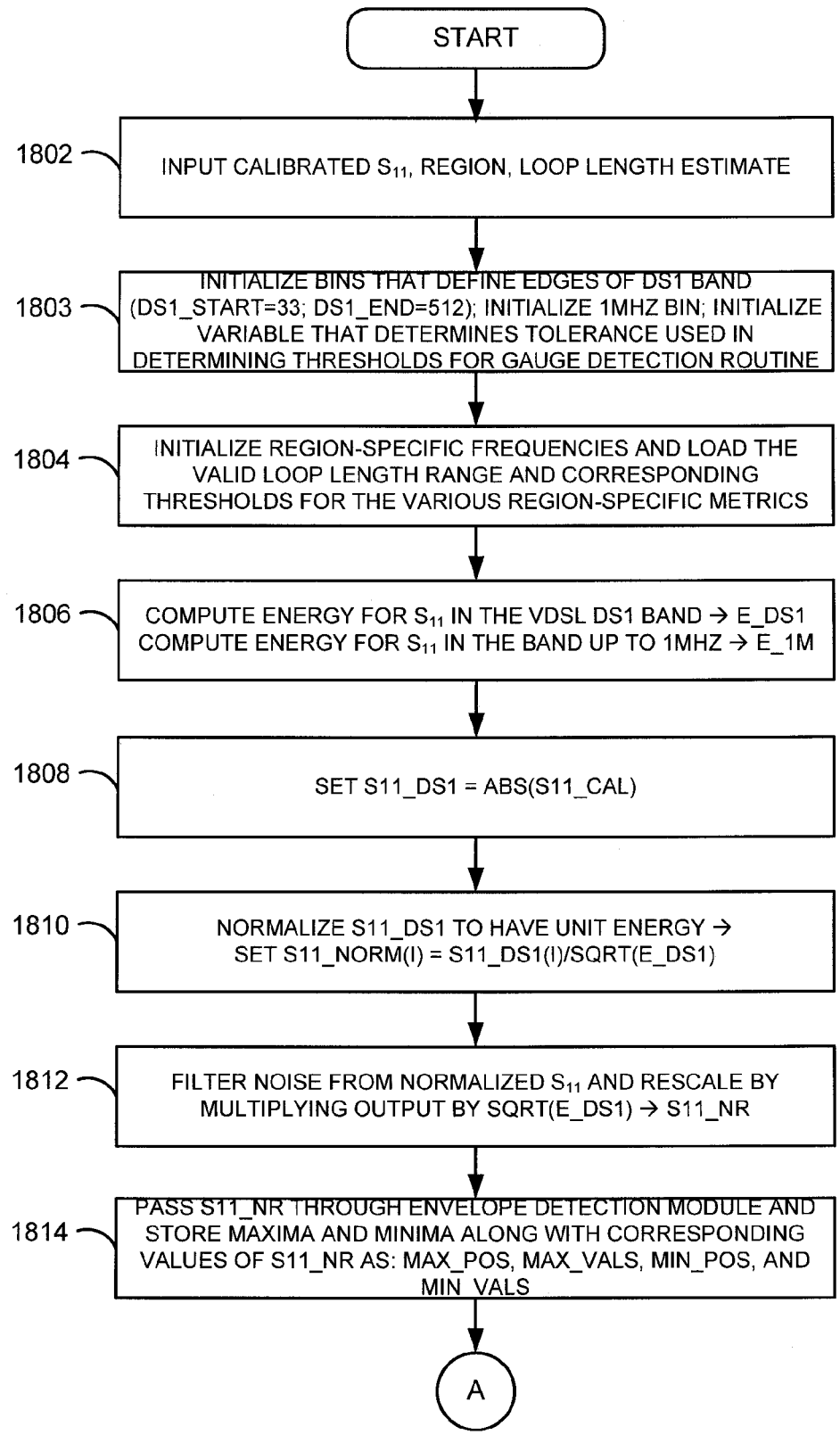
FIG. 18A-B is an embodiment for determining the loop gauge as shown in FIGS. 4A-B.
Figure 18B:
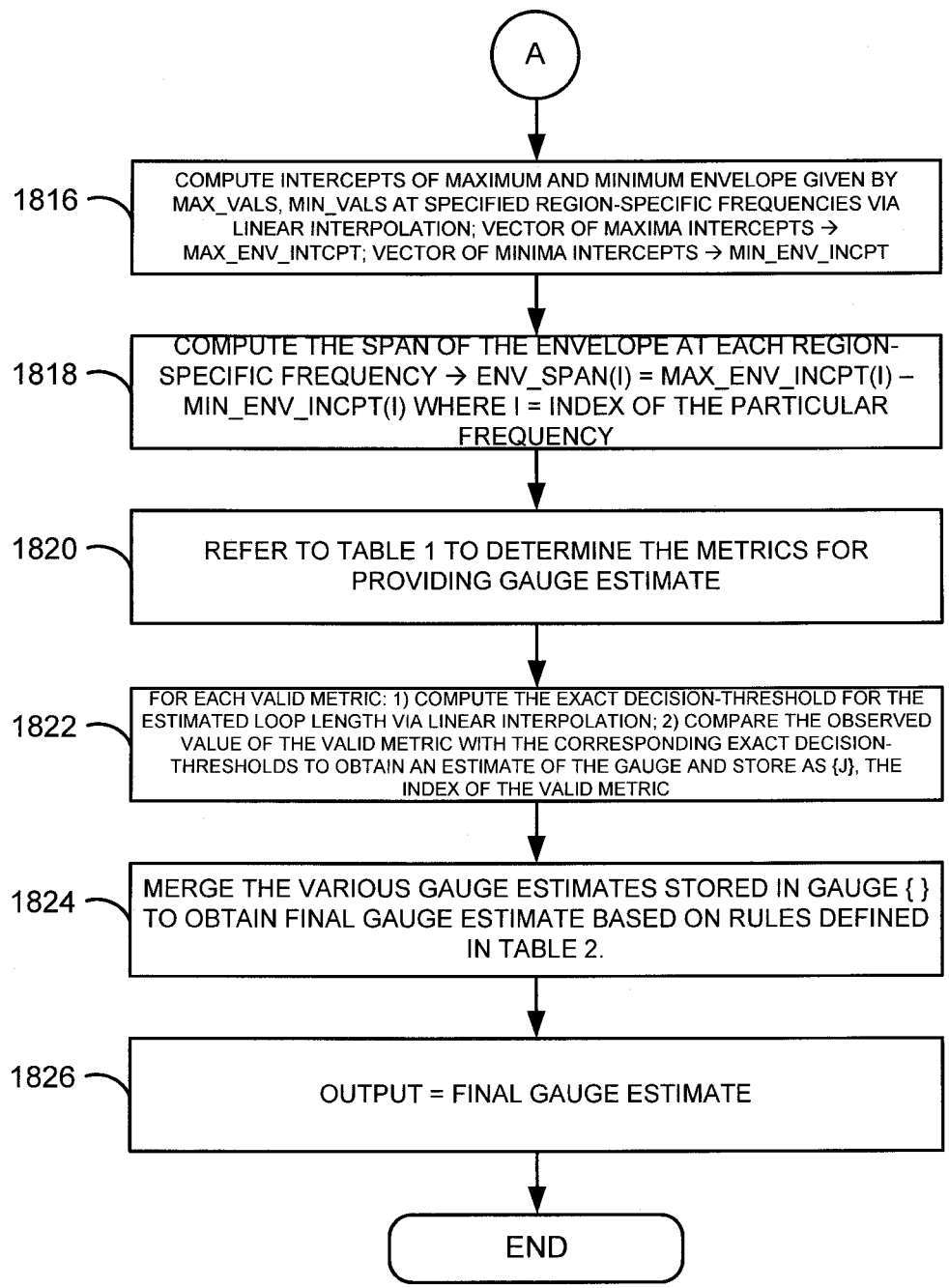

In accordance with exemplary embodiments for performing loop gauge estimation and with reference to FIGS. 18A-B, the following inputs are utilized: 1) the calibrated echo response $S_{11}(f)$; 2) the loop length estimate; and 3) the region of deployment (e.g., North America vs. Japan) (step 1802). Using the loop length estimate, an appropriate set of discriminating features or metrics are chosen. Various characteristics in the calibrated echo are monitored and compared with tabulated thresholds in order to obtain feature-wise decisions. The individual feature-wise decisions are then merged to obtain an overall gauge decision.

As depicted in FIG. 18A, the following are initialized: 1) the bins that define the edges of the DS1 band (DS1_start=33, DS1_end=512); 2) the bin corresponding to 1 MHz (bin_1 MHz=232); and 3) the variable that determines the tolerance used in determining the thresholds for the gauge-detection routine (tol=0.3). Next, the region-specific check-frequencies (e.g., check_freqs=250, 500, 1000 kHz for "Japan"; check_freqs=250, 300, 1500 kHz for "North America") are initialized (steps 1803, 1804). In step 1806, the energy for the per-port calibrated $S_{11}$ parameter is computed for the DS1 band as well as the energy in the bands up to 1 MHz. The variable S11_DS1 is set to the absolute value of the $S_{11}$ parameter in step 1808. This value is then normalized and filtered prior to processing (steps 1810, 1812), resulting in S11_NR. The maxima and minima of this value (S11_NR) are then determined by performing envelope detection and stored (step 1814).

In step 1816, the intercepts of the maximum and minimum envelope at the region-specific check-frequencies are computed and stored. The span of the envelope at each check-frequency is computed (step 1818). Based on the information derived in the preceding steps, Table 1 (below) is used to determine the metrics for deriving a loop gauge estimate (step 1820).

TABLE 1

| Region and Supported Gauges | Metric | Range of Useful Lengths |
|---|---|---|
| North America: '24 AWG', '26 AWG', and 'unknown'. | 1 The minimum-envelope intercept of abs(S11_cal) at 1500 kHz | [200 ft-400 ft] |
| | 2 The energy of S11_cal in the frequency band up to 1 MHz (i.e., E_1M) | [400 ft-2400 ft] |
| | 3 The maximum-envelope intercept of abs(S11_cal) at 300 kHz | [600 ft-3200 ft] |
| | 4 The maximum-envelope intercept of abs(S11_cal) at 250 kHz | [1800 ft-4000 ft] |
| | 5 The envelope span of abs (S11_cal) at 300 kHz | [3400 ft-6600 ft] |
| Japan: '0.4 Poly', '0.4 Paper', '0.65 Poly', and 'unknown' | 1 The maximum-envelope intercept of abs(S11_cal) at 1000 kHz | [100 m-700 m] |
| | 2 The energy of S11_cal in the frequency band up to 1 MHz (i.e., E_1M) | [150 m-500 m] |
| | 3 The maximum-envelope intercept of abs(S11_cal) at 500 kHz | [200 m-1100 m] |
| | 4 The maximum-envelope intercept of abs(S11_cal) at 250 kHz | [650 m-1400 m] |
| | 5 The envelope span of abs (S11_cal) at 250 kHz | [1300 m-2000 m] |

Table 1 is a list of the various region-specific metrics and the range of loop-lengths over which these metrics are useful to discriminate between gauges. As an example, for a loop length estimate between 400 and 2,400 ft, metric 2 (energy of S11_cal in the frequency band up to 1 MHz) would be used to determine the particular loop gauge.

For each of the valid metrics, the exact decision-thresholds for the estimated loop length are computed via linear interpolation. Further, the observed value of the valid metric is compared with the corresponding exact decision-thresholds to obtain an estimate of the gauge and stored in the variable gauge{j}, where j is the index of the valid metric. Finally, the various gauge estimates stored in gauge{ } are merged to obtain a final gauge estimate (final_gauge) based on the rules given in Table 2 below. As discussed earlier, the loop gauge is determined based on a merging criterion of one or more individual decisions based on these characteristics (step 1824, 1826).

TABLE 2

| Number of valid metrics | Merging rule |
|---|---|
| 1 (trivial merge) | Final gauge is simply the same as the sole intermediate gauge decision |
| 2 | a) If both intermediate gauge-decisions are the same: The final gauge equals either of the intermediate gauge decisions |
| | b) If exactly one intermediate decision is 'unknown': The final gauge equals the other intermediate decision (The 'unknown' decision is discarded). |
| | c) If the two intermediate decisions are different and neither is 'unknown', the final gauge is 'unknown'. |
| 3 | a) The final gauge decision equals the gauge decision determined by the majority of the three valid metrics. |
| | b) If the three metrics give three different intermediate gauge-decisions, the final gauge is 'unknown' (This is the 1-1-1 case). |
| 4 | a) If three or more valid metrics give the same intermediate gauge decision, the final gauge decision equals the decision of the clear majority (This is the 3-1 or 4-0 case). |
| | b) If two of the valid metrics concur on an intermediate gauge decision, but the other two valid metrics do not concur, then the final gauge decision equals the most common decision, i.e., that represented by the two valid metrics that concur. (This is the 2-1-1 case). |
| | c) If two of the valid metrics concur on one intermediate gauge decision, while the other two concur on a different intermediate gauge decision, then the final gauge decision is 'unknown'. (This is the 2-2 case). |
| | d) If all four valid metrics give different intermediate gauge decisions, then the final gauge decision is 'unknown'. (This is the 1-1-1-1 case). |

Table 2 above provides a list of rules for deriving the final gauge estimate based on merging the gauge estimates of the valid metrics (called intermediate gauge decisions).

It should be noted that the invention is not limited to the embodiments described above. Further, it should be noted that while the processes herein are described for the North American and Japanese regions, many variations and modifications may be made to the above-described embodiments without departing from the principles of the present disclosure such that other regions can be supported. Accordingly, it should be emphasized that the above-described embodiments are merely examples of possible implementations. All such modifications and variations are intended to be included herein within the scope of this disclosure and protected by the following claims.

At least the following is claimed:

1. A method comprising:
receiving an echo signal for a loop under test, the echo signal being a per-port calibrated echo response obtained using frequency domain reflectometry single-ended line testing (FDR-SELT); and
analyzing characteristics of the echo signal to perform a loop length estimation based on data relating to ripple frequency as a function of loop length, the method further comprising specifying a region for performing the loop length estimation, the loop length estimation being further performed based on the specified region.

2. The method of claim 1, wherein the region comprises one of: North America and Japan.

3. The method of claim 1, wherein analyzing characteristics of the echo signal comprises determining a ripple period of the echo signal amplitude.

4. A method comprising:
  measuring a calibrated echo signal of a loop under test; and
  estimating a loop length based on ripples on the calibrated echo signal and a specified region.

5. The method of claim 4, further comprising:
  determining whether the loop has a long loop length based on a predetermined threshold; and
  in response to determining that the loop is a long loop, providing an indication that the loop under test is a long loop.

6. The method of claim 5, wherein the predetermined threshold is one of 6,600 ft and 2 km.

7. The method of claim 4, wherein the specified region is one of North America and Japan.

8. The method of claim 4, wherein estimating the loop length comprises:
  measuring energy of the calibrated echo signal in the VDSL DS1 band and normalizing a value of an echo response; and
  calculating a mean ripple frequency of the normalized echo response and estimating the loop length based on an equation.

9. The method of claim 8, further comprising filtering the normalized value to remove noise from the normalized calibrated echo response.

10. The method of claim 8, wherein calculating a mean ripple frequency of the echo response comprises:
  determining an average separation between peaks in the echo response and based on the average separation with respect to a predetermined threshold, determining whether the loop is a short loop;
  in response to determining that the loop is a short loop, estimating the loop length based on the equation; and
  in response to determining that the loop is not a short loop, obtaining an updated mean ripple period and estimating the length based on the equation.

11. The method of claim 10, wherein estimating the length of the loop is performed according to the equation:

$$\mathrm{Loop\_Length} = k\left(\frac{\left(\frac{1}{\mathrm{rpl\_prd}} + a\right)}{b}\right)$$

wherein rpl_prd is the mean ripple period, and k, a, b are tunable parameters.

12. The method of claim 11, wherein
  k=3.281, a=0.00000641, b=0.00004708 if the specified region is North America, wherein the loop length (Loop_Length) is calculated in feet.

13. The method of claim 11, wherein k=1, a=0.00002722, b=0.00004558 if the specified region is Japan, wherein the loop length (Loop_Length) is calculated in meters.

14. A system comprising:
  a first module coupled to a loop, the first module configured to generate a test signal and receive a reflected signal to determine an echo response of the loop;
  a second module configured to receive the echo response measurement from the first module, the second module configured to determine characteristics associated with the loop based on the echo response, the second module configured to output a loop length estimation based on data relating to ripple frequency as a function of loop length; and
  a noise removal module configured to reduce noise on the reflected signal to increase accuracy of the loop length estimation.

15. The system of claim 14, wherein the first module comprises: a signal generator to send the test signal onto the loop;
  an analyzer configured to measure scattering parameters (s-parameters) based on the reflected signal and determine the echo response of the loop.

16. The system of claim 14, wherein the second module is further configured to receive a specified region associated with the loop.

17. The system of claim 16, wherein the specified region is one of: North America and Japan.

18. The system of claim 14, wherein the second module comprises a loop length estimator configured to output an estimated loop length by observing a period of ripples in the amplitude of the echo response and mapping the period of ripples to a particular loop length.

19. The system of claim 18, wherein the second module is further configured to indicate that estimated loop length is unknown if the loop is a bridge-tapped loop or if the estimated loop length is inconsistent with the echo response.

20. The method of claim 3, further comprising:
  reducing noise on the reflected signal to increase accuracy of the loop length estimation.

* * * * *